US011922782B2

(12) United States Patent
Izumida et al.

(10) Patent No.: US 11,922,782 B2
(45) Date of Patent: Mar. 5, 2024

(54) MEDIUM HANDLING METHOD AND MEDIUM HANDLING DEVICE

(71) Applicant: Glory Ltd., Himeji (JP)

(72) Inventors: Tsuyoshi Izumida, Himeji (JP); Masao Sakamoto, Himeji (JP); Keisuke Nada, Himeji (JP)

(73) Assignee: GLORY LTD., Himeji (JP)

( * ) Notice: Subject to any disclaimer, the term of this patent is extended or adjusted under 35 U.S.C. 154(b) by 97 days.

(21) Appl. No.: 17/835,974

(22) Filed: Jun. 9, 2022

(65) Prior Publication Data

US 2022/0398902 A1 Dec. 15, 2022

(30) Foreign Application Priority Data

Jun. 10, 2021 (JP) ................................ 2021-097143

(51) Int. Cl.
*G07F 19/00* (2006.01)
*G07D 11/26* (2019.01)

(52) U.S. Cl.
CPC ........... *G07F 19/206* (2013.01); *G07D 11/26* (2019.01); *G07F 19/202* (2013.01)

(58) Field of Classification Search
CPC ...... G07F 19/206; G07F 19/202; G07D 11/26
USPC ........................................................ 235/379
See application file for complete search history.

(56) References Cited

U.S. PATENT DOCUMENTS

2014/0144750 A1 5/2014 Shimizu et al.

FOREIGN PATENT DOCUMENTS

EP 3480795 A1 5/2019
JP 2018-120638 A 8/2018
JP 2021-056742 A 4/2021

*Primary Examiner* — Daniel A Hess
(74) *Attorney, Agent, or Firm* — XSENSUS LLP

(57) ABSTRACT

A control unit performs a reconciliation process in a case where an error occurs while a transport unit is transporting media to a temporary storage unit or a storage unit and the number of media stored in a memory becomes uncertain, the reconciliation process being a process in which the control unit checks the number of media stored in the memory using the temporary storage unit while at least a part of the media remain in the temporary storage unit.

15 Claims, 11 Drawing Sheets

MEDIUM HANDLING METHOD AND MEDIUM HANDLING DEVICE

CROSS-REFERENCE TO RELATED APPLICATION

This application claims priority to Japanese Patent Application No. 2021-097143 filed on Jun. 10, 2021, the entire disclosure of which is incorporated herein by reference.

BACKGROUND

A conventional banknote depositing and dispensing machine performs a deposit process. A deposit unit of the banknote depositing and dispensing machine sequentially takes banknotes into the banknote depositing and dispensing machine. A recognition unit recognizes the banknotes. A temporary storage unit stores the recognized banknotes. The number of banknotes to be deposited is confirmed. After the number of banknotes is confirmed, the temporary storage unit feeds out the banknotes. A storage unit stores the banknotes fed out of the temporary storage unit.

SUMMARY

A medium handling method that is performed by a medium handling device when an error occurs during a medium deposit process of storing media from an inlet into a storage via a temporary storage, the medium handling method comprising: recognizing the media sequentially taken into the medium handling device via the inlet by a detector; storing the recognized media in the temporary storage; storing the number of media stored in the temporary storage by a memory; confirming the number of media stored in the temporary storage as a number of media deposited based on an operation of an operator by a controller; after confirming the number of media stored in the temporary storage, storing the media fed out of the temporary storage in the storage, and storing the number of media stored in the storage by the memory; wherein the controller performs a reconciliation process in a case where the error occurs while a transport member is transporting the media to the temporary storage or the storage and the number of media stored in the memory becomes uncertain, the reconciliation process being a process in which the controller checks the number of media stored in the memory using the temporary storage while at least a part of the media remain in the temporary storage.

DETAILED DESCRIPTION

Figure 1:
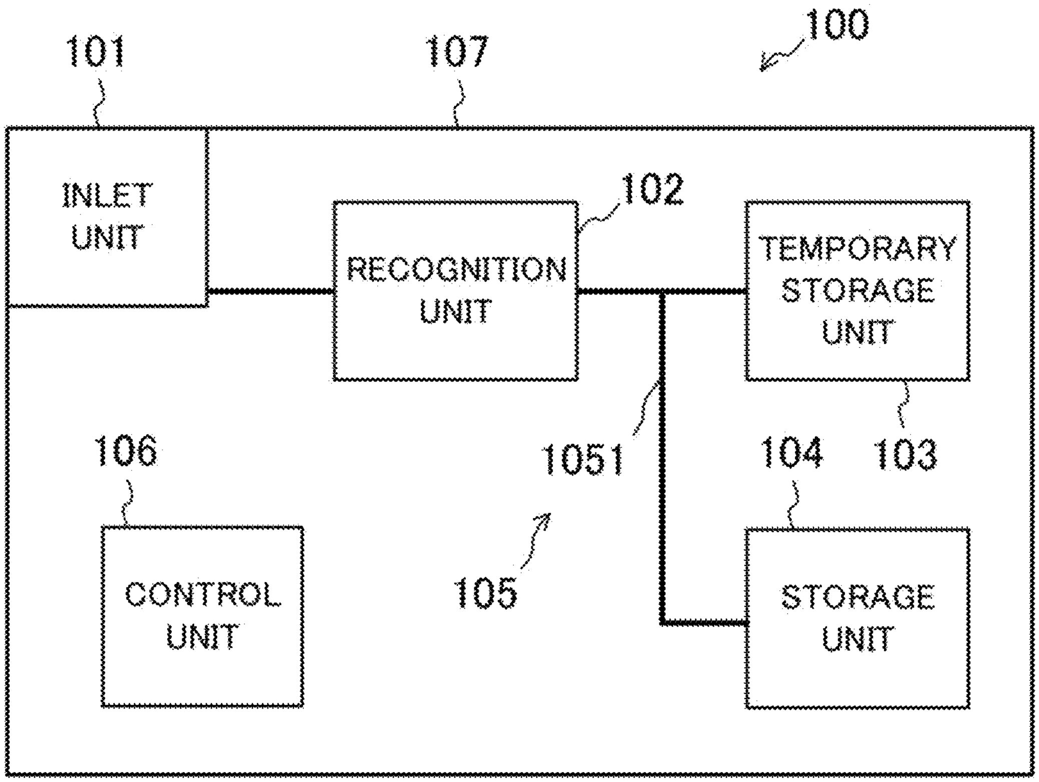
FIG. 1 shows a medium handling device.

When the medium handling device stops working due to an error that occurs during the deposit process, the number of media stored in the temporary storage unit or the storage unit may become uncertain. A conventional medium handling device stops the deposit process and performs a reconciliation process. However, it takes time to perform the reconciliation process. When the number of media stored in the storage unit becomes uncertain, the medium handling device cannot promptly resume the deposit process.

There are also cases where the conventional medium handling device resumes the deposit process without using the storage unit for which the number of media stored therein is uncertain. However, if recovery from the error is not performed, another storage unit may quickly become full or empty since a part of the storage units is not used.

The technique disclosed herein allows a medium handling device to efficiently recover from an error.

The technique disclosed herein relates to a medium handling method that is performed by a medium handling device when an error occurs during a medium handling process of storing media from an inlet unit into a storage unit via a temporary storage unit. In the medium handling method, a reconciliation process is performed during the medium handling process. The reconciliation process is a process of checking the number of media stored in the temporary storage unit or the storage unit in order to recover from the error. The medium handling process is, for example, a medium deposit process. In the medium handling method, the media are sequentially taken into the medium handling device via the inlet unit. The media are recognized by a recognition unit. The recognition unit is a detector. The recognized media are stored in the temporary storage unit. The number of media stored in the temporary storage unit is stored in a memory. A control unit confirms the number of media stored in the temporary storage unit as a number of media deposited based on an operation of an operator. The control unit is a control circuitry. After confirming the number of media stored in the temporary storage unit, the media fed out of the temporary storage unit are stored in the storage unit. The control unit performs a reconciliation process in a case where the error occurs while a transport unit is transporting the media to the temporary storage unit or the storage unit and the number of media stored in the memory becomes uncertain. The transport unit is a transport member which forms a transport path. The number of media stored in the memory is the number of media stored in the temporary storage unit or the storage unit. The state in which the number of media is uncertain is a state in which the value of a counter indicating the number of media is unknown, or a state in which the value of the counter is known but unreliable.

The medium handling device can efficiently recover from the error by the reconciliation process.

The case in which the error occurs may be a first case in which the error occurs while a transport unit is transporting the media from the inlet unit to the temporary storage unit via the recognition unit. In the first case, the number of media stored in the temporary storage unit may become uncertain.

The case in which the error occurs may be a second case in which the error occurs while a transport unit is transporting the media from the temporary storage unit to the storage unit. In the second case, the number of media stored in the storage unit may become uncertain.

The recognition unit may recognize unique identification information given to each medium. The memory may store the identification information in association with a storage order of the media in the temporary storage unit. The reconciliation process may include a first process. The control unit may perform the first process in the first case. In the first process, the control unit may check the number of media stored in the temporary storage unit by matching the identification information of the media identified by the recognition unit against the identification information stored in the memory.

The memory may store the identification information in association with a storage order of the media in the storage unit. The reconciliation process may include a second process. The control unit may perform the second process in the second case. In the second process, the control unit may check the number of media stored in the storage unit by matching the identification information of the media identified by the recognition unit against the identification information stored in the memory.

The control unit may switch between the first process and the second process according to the error.

The medium handling device can efficiently recover from the error in each of the first case and the second case.

The control unit can quickly check the number of media by using the identification information.

In the second process, the transport unit may transport the medium fed out of the storage unit and recognized by the recognition unit to the temporary storage unit. In this case, the medium fed out of the storage unit is transported to the temporary storage unit while the medium remains in the temporary storage unit. The remaining medium is the medium stored from the inlet unit into the temporary storage unit via the recognition unit, and is the medium having already been confirmed. The medium stored in the temporary storage unit is again fed out from the temporary storage unit and returned to the storage unit.

In the second case, the control unit may control the transport unit to stop transporting the media from the temporary storage unit to the storage unit, perform the reconciliation process of the storage unit, and then control the transport unit to resume transporting the media from the temporary storage unit to the storage unit.

The medium handling device can quickly resume the process after checking the number of media.

In the second case, the control unit may control the transport unit to continue to transport the media from the temporary storage unit to a storage unit other than the storage unit, and check the number of media stored in the storage unit after all the media stored in the temporary storage unit are fed out of the temporary storage unit.

The medium handling device can give priority to completion of the process and can check the number of media after completion of the process.

Before starting the second process, the control unit may cause the temporary storage unit to feed out a part of the media and store the part of the media in a second storage unit different from the storage unit.

The medium handling device can perform the second process by using the temporary storage unit in which room has been made, and can resume the process after checking the number of media.

In the second case, the control unit may selectively execute a first mode or a second mode, the first mode being a mode in which the control unit resumes the medium handling process after the second process, and the second mode being a mode in which the control unit checks the number of media stored in the storage unit after continuing the medium handling process without using the storage unit. In the second mode, the control unit may check the number of media stored in the storage unit after the temporary storage unit runs out of media.

The medium handling device can efficiently recover from the error in various situations.

The control unit may execute the mode registered in advance, or may execute the mode selected when the error occurs.

The medium handling device can efficiently recover from the error by executing the mode according to the situation.

In the second process, the transport unit may transport the medium fed out of the storage unit and determined to be normal by the recognition unit to the temporary storage unit, and transport any medium fed out of the storage unit and determined to be abnormal by the recognition unit to a third storage unit different from the storage unit. In the second process, the transport unit may transport both the medium fed out of the storage unit and determined to be normal by the recognition unit and any medium fed out of the storage unit and determined to be abnormal by the recognition unit to the third storage unit different from the storage unit. In the second process, the transport unit may transport both the medium fed out of the storage unit and determined to be normal by the recognition unit and any medium fed out of the storage unit and determined to be abnormal by the recognition unit to outside of the medium handling device.

The medium handling device can appropriately recover from the error according to the situation.

In the first process, the transport unit may transport the medium fed out of the temporary storage unit and recognized by the recognition unit to the temporary storage unit. The transport unit may transport the medium determined to be normal by the recognition unit to the temporary storage unit, and transport any medium fed out of the temporary storage unit and determined to be abnormal by the recognition unit to the outside of the medium handling device. The transport unit may include a loop transport path. The media are transported along the loop transport path. The recognition unit is located on the loop transport path. The temporary storage unit is connected to the loop transport path.

In the first process, the transport unit may transport both the medium fed out of the temporary storage unit and determined to be normal by the recognition unit and any medium fed out of the temporary storage unit and determined to be abnormal by the recognition unit to the outside of the medium handling device.

The medium handling device can appropriately check the number of media according to the situation.

The control unit may control the transport unit to change a transport destination of the medium having passed through the recognition unit according to a selection operation.

The medium handling device can efficiently recover from the error in various situations.

In the first case, the control unit may cause the temporary storage unit to feed out a part of the media, and store the part of the media in a fourth storage unit different from the storage unit, and the transport unit may subsequently transport the medium fed out of the fourth storage unit and determined to be normal by the recognition unit to the temporary storage unit, and transport any medium fed out of the fourth storage unit and determined to be abnormal by the recognition unit to a dispense unit located outside the medium handling device.

The medium handling device can efficiently recover from the error by using the fourth storage unit.

The technique disclosed herein relates to a medium handling device that performs a process when an error occurs during a medium handling process. The medium handling device includes: an inlet unit that is located in a housing and that sequentially takes media into the housing; a recognition unit that recognizes the media in the housing; a temporary storage unit that temporarily stores the media; a storage unit that stores the media; a transport unit that includes a transport path and that transports the media among the inlet unit, the recognition unit, the temporary storage unit, and the storage unit; a memory; and a control unit. The control unit controls the inlet unit, the recognition unit, the temporary storage unit, the storage unit, the transport unit, and the memory in a medium deposit process of storing the media in the storage unit. The control unit causes the inlet unit to take the media into the housing. The control unit causes the recognition unit to recognize the media sequentially taken into the housing. The control unit stores the recognized media in the temporary storage unit. The control unit causes the memory to store the number of media stored in the temporary storage unit. The control unit confirms the number of media stored in the temporary storage unit as a number of media deposited based on an operation of an operator. The control unit stores the media fed out of the temporary storage unit in the storage unit, and stores the number of media stored in the storage unit in the memory. The control unit performs a reconciliation process in a case where the error occurs while the transport unit is transporting the media to the temporary storage unit or to the storage unit, and the number of media stored in the memory becomes uncertain. The number of media stored in the memory is the number of media stored in the temporary storage unit or the storage unit. The state in which the number of media is uncertain is a state in which the value of a counter indicating the number of media is unknown, or a state in which the value of the counter is known but unreliable.

The medium handling device can efficiently recover from the error.

The case in which the error occurs may be a first case in which the error occurs while a transport unit is transporting the media from the inlet unit to the temporary storage unit via the recognition unit. In the first case, the number of media stored in the temporary storage unit may become uncertain.

The case in which the error occurs may be a second case in which the error occurs while a transport unit is transporting the media from the temporary storage unit to the storage unit. In the second case, the number of media stored in the storage unit may become uncertain.

The recognition unit may recognize unique identification information given to each medium. The memory may store the identification information in association with a storage order of the media in the temporary storage unit. The reconciliation process may include a first process. The control unit may perform the first process in the first case. In the first process, the control unit may check the number of media stored in the temporary storage unit by matching the identification information of the media identified by the recognition unit against the identification information stored in the memory.

The memory may store the identification information in association with a storage order of the media in the storage unit. The reconciliation process may include a second process. The control unit may perform the second process in the second case. In the second process, the control unit may check the number of media stored in the storage unit by matching the identification information of the media identified by the recognition unit against the identification information stored in the memory.

The control unit may switch between the first process and the second process according to the error.

The transport unit may include a loop transport path, and the media may be transported along the loop transport path. The recognition unit may be located on the loop transport path. The inlet unit, the temporary storage unit, and the storage unit may be connected to the loop transport path.

The medium handling device with this configuration can efficiently recover from the error.

Hereinafter, embodiments of a medium handling method and a medium handling device will be described with reference to the accompanying drawings. The medium handling methods and the medium handling devices that are described herein are illustrated by way of example only.

First Embodiment

FIG. 1 illustrates a medium handling device 100. The medium handling device 100 includes an inlet unit 101, a recognition unit 102, a temporary storage unit 103, a storage unit 104, a transport unit 105, and a control unit 106.

The inlet unit 101 is located in a housing 107 of the medium handling device 100, and sequentially feeds media into the housing 107. The recognition unit 102 recognizes media in the housing 107. The recognition unit 102 acquires the number of media having passed therethrough. The temporary storage unit 103 temporarily stores media. The storage unit 104 stores media.

The transport unit 105 has a transport path 1051. The transport path 1051 connects the inlet unit 101, the recognition unit 102, the temporary storage unit 103, and the storage unit 104. The transport unit 105 transports media among the inlet unit 101, the recognition unit 102, the temporary storage unit 103, and the storage unit 104.

The control unit 106 controls the inlet unit 101, the recognition unit 102, the temporary storage unit 103, the storage unit 104, and the transport unit 105. More specifically, the control unit 106 performs a process of storing media in the storage unit 104. In this process, the control unit 106 causes the recognition unit 102 to recognize media sequentially taken into the housing 107 by the inlet unit 101, and then causes the temporary storage unit 103 to store the media therein. The control unit 106 thus confirms the number of media stored in the temporary storage unit 103. The number of media stored in the temporary storage unit 103 is the number of media that are going to be stored in the storage unit 104. After confirming the number of media stored in the temporary storage unit 103, the control unit 106 causes the storage unit 104 to store the media fed out of the temporary storage unit 103. The process is thus completed.

There are cases where an error occurs during the above medium handling process. One example is when an error occurs while the transport unit 105 is transporting media from the inlet unit 101 to the temporary storage unit 103 via the recognition unit 102 (this example is hereinafter referred to as the “first case”). In the first case, the number of media stored in the temporary storage unit 103 may become uncertain. For example, when a medium jam occurs or a plurality of media overlapping each other passes through the recognition unit 102 while the transport unit 105 is transporting media from the inlet unit 101 to the temporary storage unit 103 via the recognition unit 102, the number of media stored in the temporary storage unit 103 may become uncertain. In order to recover from the error in the first case, the control unit 106 operates the medium handling device 100 as follows. The control unit 106 causes the temporary storage unit 103 to feed out at least a part of the media and causes the recognition unit 102 to recognize them. The control unit 106 thus checks the number of media stored in the temporary storage unit 103. This is herein referred to as the "first process."

Another example is when an error occurs while the transport unit 105 is transporting media from the temporary storage unit 103 to the storage unit 104 (this example is hereinafter referred to as the "second case"). In the second case, the number of media stored in the storage unit 104 may become uncertain. For example, when a medium jam occurs while the transport unit 105 is transporting media from the temporary storage unit 103 to the storage unit 104, the number of media stored in the storage unit 104 may become uncertain. In order to recover from the error in the second case, the control unit 106 operates the medium handling device 100 as follows. The control unit 106 causes the storage unit 104 to feed out at least a part of the media and causes the recognition unit 102 to recognize them. The control unit 106 thus checks the number of media stored in the storage unit 104. This is herein referred to as the "second process."

In the medium handling device 100, the control unit 106 selectively performs either or both of the first and second processes. More specifically, in the medium handling process of storing media from the inlet unit 101 to the storage unit 104 via the temporary storage unit 103, the control unit 106 determines whether the first case has occurred while the transport unit 105 was transporting media from the inlet unit 101 to the temporary storage unit 103 via the recognition unit 102. When the control unit 106 determines that the first case has occurred, the control unit 106 performs the first process of checking the number of media stored in the temporary storage unit 103. The control unit 106 also determines whether the second case has occurred while the transport unit 105 was transporting media from the temporary storage unit 103 to the storage unit 104. When the control unit 106 determines that the second case has occurred, the control unit 106 performs the second process of checking the number of media stored in the storage unit 104. The medium handling device 100 can thus efficiently recover from the error. After the recovery from the error, the medium handling device 100 can quickly resume the medium handling process.

In an example, the medium handling device 100 switches between the first process and the second process according to the error. That is, the medium handling device 100 performs the first process in the first case, and performs the second process in the second case. The medium handling device 100 can efficiently recover from the error in both of the first case and the second case.

Second Embodiment

Figure 2:
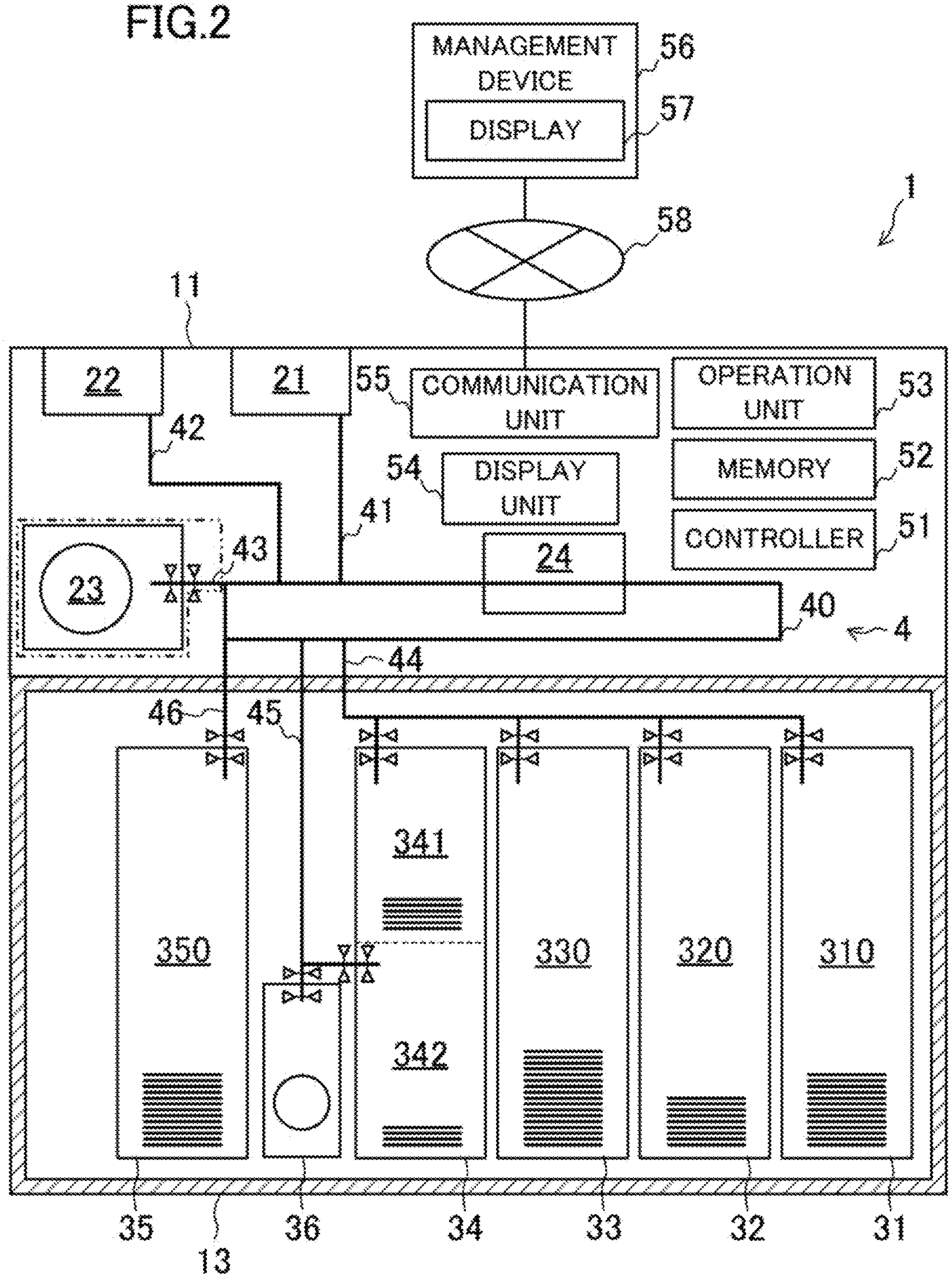
FIG. 2 shows a banknote handling device.

FIG. 2 illustrates a banknote handling device 1. The banknote handling device 1 is an example of the medium handling device, and is a modification of the medium handling device 100 shown in FIG. 1.

The banknote handling device 1 is installed in financial institutions such as banks. The banknote handling device 1 performs at least a deposit process. The banknote handling device 1 performs the process when operated by a customer of a financial institution. The banknote handling device 1 is, for example, an automated teller machine (ATM) that is a self-service machine, or a depositing machine. The banknote handling device 1 may be a teller machine such as a teller cash recycler. In the following description, the term "operator" mainly means a customer.

The banknote handling device 1 handles banknotes. The banknote handling device 1 particularly handles loose notes. The banknote handling device 1 forms a part of a money handling device. The money handling device may include a coin handling device for handling coins and/or a check handling device for handling checks, in addition to the banknote handling device 1.

FIG. 2 shows the internal structure of the banknote handling device 1. The banknote handling device 1 has an upper part and a lower part. The banknote handling device 1 includes a handling unit housing 11 located in the upper part of the banknote handling device 1 and a safe unit housing 13 located in the lower part of the banknote handling device 1. The handling unit housing 11 and the safe unit housing 13 are sometimes referred to as the "handling unit" and the "safe unit," respectively, as necessary.

A deposit unit 21, an dispense unit 22, a recognition unit 24, a temporary storage unit 23, and transport paths 40, 41, 42, and 43 are disposed in the handling unit housing 11. The transport paths 40, 41, 42, and 43 form a transport unit 4.

A plurality of storage devices 31 to 36 and transport paths 44, 45, and 46 are disposed in the safe unit housing 13. The transport paths 44, 45, and 46 form the transport unit 4.

The banknote handling device 1 includes a controller 51, a memory 52, an operation unit 53, a display unit 54, and a communication unit 55.

The deposit unit 21 is a portion into which banknotes to be deposited are placed in, for example, a deposit process. The operator manually places one or more banknotes into the deposit unit 21. The deposit unit 21 has a mechanism that takes banknotes placed in the deposit unit 21 into the handling unit housing 11 one by one. The deposit unit 21 is an example of the inlet unit.

The dispense unit 22 is a portion where banknotes to be withdrawn are accumulated in, for example, a withdrawal process. The dispense unit 22 is open to the outside of the handling unit housing 11. The operator can manually take the accumulated banknotes out of the dispense unit 22. The dispense unit 22 may be provided with a shutter.

The recognition unit 24 recognizes at least the authenticity, denomination, and fitness of each banknote. The recognition unit 24 also acquires the serial number of each banknote, that is, the identification number of each banknote. The recognition unit 24 acquires information on the number of banknotes having passed therethrough. The recognition unit 24 is located on a loop transport path 40 that will be described later.

The temporary storage unit 23 can temporarily store banknotes and can feed out the stored banknotes. The temporary storage unit 23 temporarily stores banknotes to be deposited in, for example, a deposit process. As will be described later, the temporary storage unit 23 also temporarily stores banknotes in a reconciliation process.

The temporary storage unit 23 may be a tape storage unit that stores banknotes by winding the banknotes together with a tape around a drum. Tape storage units are advantageous in that the order of banknotes will not change when the banknotes are stored in or fed out of the tape storage unit. Tape storage units are also advantageous in that they can store banknotes of various sizes together. A known configuration of tape storage units can be used for the temporary storage unit 23. The temporary storage unit 23 has a larger capacity than conventional temporary storage units. The temporary storage unit 23 can store, for example, 300 banknotes at a time. Although an example in which the temporary storage unit 23 is a tape storage unit will be described below, the temporary storage unit 23 may be a stack storage unit.

A third transport path 43, which will be described later, is connected to the temporary storage unit 23. A sensor that detects the passage of banknotes is mounted at the connection point between the temporary storage portion 23 and the third transport path 43. The controller 51 of the banknote handling device 1 counts the banknotes fed into the temporary storage unit 23 and counts the banknotes fed out of the temporary storage unit 23, based on the detection signals of the sensor. The controller 51 manages the number of banknotes stored in the temporary storage unit 23 based on the count.

The banknote handling device 1 includes a first storage device 31, a second storage device 32, a third storage device 33, a fourth storage device 34, and a fifth storage device 35. For example, the banknote handling device 1 can store banknotes taken thereinto by the deposit unit 21 in the storage device (first storage device 31 etc.) of the safe unit housing 13 via the temporary storage unit 23.

The first, second, third, and fifth storage devices 31, 32, 33, and 35 have the same configuration. These storage devices 31, 32, 33, and 35 are stack storage units. Stack storage units store banknotes in a stack. Each of the first, second, third, and fifth storage devices 31, 32, 33, and 35 includes one storage unit 310, 320, 330, 350, respectively. The first, second, third and fifth storage devices 31, 32, 33, and 35 can take banknotes into the storage units 310, 320, 330, and 350 and store the banknotes in the storage units 310, 320, 330, and 350, respectively. The first, second, third, and fifth storage devices 31, 32, 33, and 35 can feed the stored banknotes out of the storage units 310, 320, 330, and 350, respectively. However, in the banknote handling device 1 illustrated in FIG. 2, the fifth storage device 35 does not feed the stored banknotes out of the storage unit 350.

A fourth transport path 44 or a sixth transport path 46, which will be described later, is connected to the first, second, third, and fifth storage devices 31, 32, 33, and 35. Sensors that detect the passage of banknotes are mounted at the connection points between the fourth transport path 44 or the sixth transport path 46 and the first, second, third, and fifth storage devices 31, 32, 33, and 35. The controller 51 of the banknote handling device 1 counts the banknotes fed into each of the first, second, third, and fifth storage devices 31, 32, 33, and 35 and counts the banknotes fed out of each of the first, second, and third storage devices 31, 32, and 33, based on the detection signals of the sensors. The controller 51 manages the number of banknotes stored in each of the storage units 310, 320, 330, and 350 based on the counts.

The fourth storage device 34 is also a stack storage unit. The fourth storage device 34 includes two storage units, an upper storage unit 341 and a lower storage unit 342. The upper storage unit 341 and the lower storage unit 342 are independent of each other. The upper storage unit 341 takes banknotes into the upper storage unit 341 and stores them in the upper storage unit 341. The upper storage unit 341 also feeds out the stored banknotes. Similarly, the lower storage unit 342 takes banknotes into the lower storage unit 342 and stores them in the lower storage unit 342. The lower storage unit 342 also feeds out the stored banknotes.

The fourth transport path 44 is connected to the upper storage unit 341, and the fifth transport path 45 is connected to the lower storage unit 342. Sensors that detect the passage of banknotes are mounted at the connection point between the upper storage unit 341 and the fourth transport path 44 and the connection point between the lower storage unit 342 and the fifth transport path 45. The controller 51 of the banknote handling device 1 counts the banknotes fed into the upper storage unit 341 and the lower storage unit 342 and counts the banknotes fed out of the upper storage unit 341 and the lower storage unit 342, based on the detection signals of the sensors. The controller 51 manages the numbers of banknotes stored in each of the upper and lower storage units 341, 342 based on the counts.

The first storage device 31, the second storage device 32, the third storage device 33, and the upper and lower storage units 341, 342 of the fourth storage device 34 can store banknotes of different denominations from each other. The fifth storage device 35 stores banknotes that are not stored in the first storage device 31, the second storage device 32, the third storage device 33, and the fourth storage device 34. When the banknote handling device 1 continues to be in operation even after the first storage device 31 becomes full, the fifth storage device 35 stores banknotes of the denomination that are supposed to be transported to the first storage device 31 (the same applies to the second to fourth storage devices 32 to 34). The fifth storage device 35 also stores any abnormal note determined to be abnormal by the recognition unit 24 during a withdrawal process. The denominations to be stored in the storage devices 31 to 35 can be changed according to the settings. For example, two or more storage devices may store banknotes of the same denomination.

A small storage device 36 is located between the fourth storage device 34 and the fifth storage device 35. The small storage device 36 is a tape storage unit. The small storage device 36 has a smaller capacity than the temporary storage unit 23. The small storage unit 36 can temporarily store banknotes and feed out the stored banknotes.

The configuration of the storage devices shown in FIG. 2 is merely illustrative. The number of storage devices and their arrangement are not limited to the configuration example shown in FIG. 2. The structure of each storage device is not limited to the configuration example shown in FIG. 2. For example, the fourth storage device 34 may be a storage device including one storage unit. The fifth storage device 35 may be a storage device including two storage units. The small storage device 36 may be omitted.

The transport unit 4 transports banknotes one by one inside the banknote handling device 1 with an interval between the banknotes. For example, the transport unit 4 transports banknotes with their long edges facing in the transport direction. The transport unit 4 may transport banknotes with their short edges facing in the transport direction. The transport unit 4 includes the transport paths 40, 41, 42, 43, 44, 45, and 46. Each of the transport paths 40, 41, 42, 43, 44, 45, and 46 is composed of a combination of a large number of rollers, a plurality of belts, a motor for driving the rollers and the belts, and a plurality of guides.

The transport path 40 is in the shape of a loop. The loop transport path 40 is disposed in the handling unit housing 11. The recognition unit 24 is located on the loop transport path 40. Banknotes are transported in the forward direction and the reverse direction on the loop transport path 40. The forward direction is clockwise in FIG. 2, and the reverse direction is counterclockwise in FIG. 2.

The first transport path 41 connects the deposit unit 21 and the loop transport path 40 to each other. The second transport path 42 connects the dispense unit 22 and the loop transport path 40 to each other. The third transport path 43 connects the temporary storage portion 23 and the loop transport path 40 to each other.

The fourth transport path 44 diverges into a plurality of paths at intermediate positions. The fourth transport path 44 connects the first storage device 31, the second storage device 32, the third storage device 33, and the upper storage unit 341 of the fourth storage device 34 to the loop transport path 40.

The fifth transport path 45 also diverges into a plurality of paths at intermediate positions. The fifth transport path 45 connects the lower storage unit 342 of the fourth storage device 34 and the small storage device 36 to the loop transport path 40. The sixth transport path 46 connects the fifth storage device 35 to the loop transport path 40.

Diverter mechanisms that divert banknotes are provided at the connection points between the loop transport path 40 and the first to sixth transport paths 41 to 46 and the diverging points of the fourth transport path 44. Passage sensors that detect the passage of banknotes and timing sensors that detect the ends of banknotes are mounted at various positions on the loop transport path 40 and the first to sixth transport paths 41 to 46. The controller 51 controls each diverter mechanism through the transport unit 4 based on the detection signals of the passage sensors and the timing sensors. Banknotes are thus transported to a predetermined destination.

The controller 51 controls the banknote handling device 1. The controller 51 can include a central processing unit (CPU), a memory, and an input and output (I/O) circuit. The CPU executes programs. The memory stores the programs and data for the operation of the banknote handling machine 1. The memory is, for example, a random access memory (RAM) and/or a read-only memory (ROM). The I/O circuit inputs and outputs electrical signals between the controller 51 and each device connected to the controller 51. The deposit unit 21, the dispense unit 22, the temporary storage unit 23, the recognition unit 24, the first storage device 31, the second storage device 32, the third storage device 33, the fourth storage device 34, the fifth storage device 35, the small storage device 36, the transport unit 4, the memory 52, the operation unit 53, the display unit 54, and the communication unit 55 are connected to the controller 51 so that they can send and receive signals to and from the controller 51.

The memory 52 stores various kinds of data etc. The memory 52 is, for example, a magnetic memory device or a nonvolatile semiconductor memory device. The operator can operate the operation unit 53. The operator who operates the operation unit 53 is a customer of a financial institution or a person in charge from a financial institution. The display unit 54 visually provides various kinds of information to the operator. The display unit 54 is, for example, a liquid crystal display device. A touch panel is a combination of the operation unit 53 and the display unit 54. The communication unit 55 communicates with a management device 56 via a network 58. The network 58 is a wide area network and/or a local area network.

The management device 56 includes a display 57 that displays various kinds of information. The management device 56 may be, for example, a personal computer (PC). A person in charge from a financial institution can manage the banknote handling device 1 by using the management device 56.

When the operator operates the operation unit 53, the controller 51 controls the deposit unit 21, the dispense unit 22, the temporary storage unit 23, the recognition unit 24, the transport unit 4, the first storage device 31, the second storage device 32, the third storage device 33, the fourth storage device 34, the fifth storage device 35, and the small storage device 36 to perform various processes related to banknotes.

Deposit Process

Figure 3:
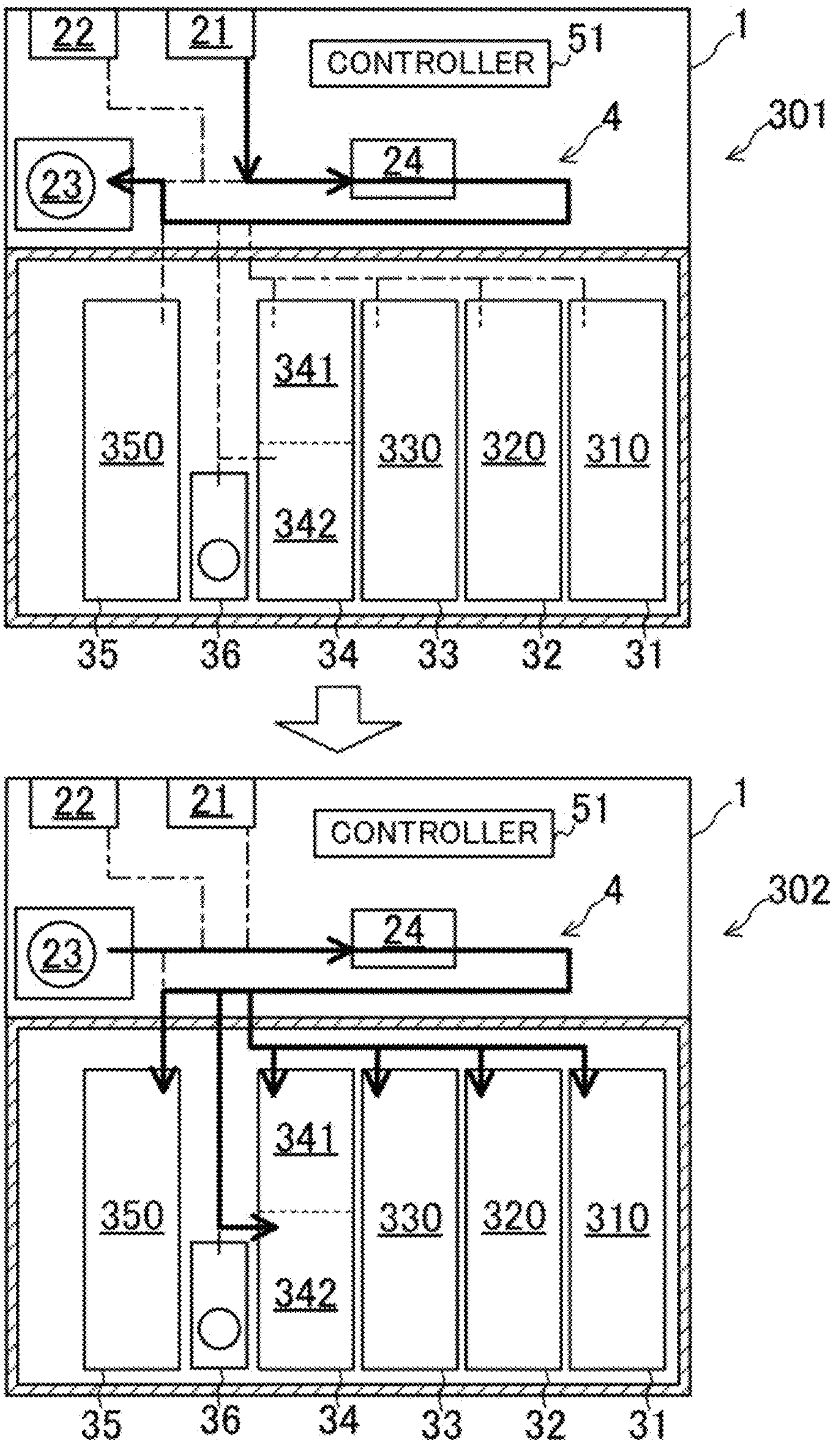
FIG. 3 shows exemplary banknote transport routes in a deposit process.

The deposit process, which is one of the processes performed by the banknote handling device 1, will be described with reference to FIG. 3. In the deposit process, the banknote handling device 1 stores banknotes placed into the deposit unit 21 in the storage device. FIG. 3 illustrates a transport path for banknotes in the deposit process.

The operator places banknotes to be deposited into the deposit unit 21. The deposit unit 21 takes the banknotes one by one into the banknote handling device 1. The transport unit 4 transports the banknotes to the recognition unit 24. The recognition unit 24 recognizes the banknotes. The transport unit 4 transports the banknotes having passed through the recognition unit 24 to the temporary storage unit 23. The temporary storage unit 23 stores the banknotes (see the arrows in the upper figure of FIG. 3). The controller 51 stores information on the banknotes stored in the temporary storage unit 23 in the memory 52. The memory 52 stores the serial numbers of the banknotes in such a manner that the order of the serial numbers stored in the memory 52 matches the order of the banknotes stored in the temporary storage unit 23. Information indicating the correspondence between the storage order of the banknotes and the storage order of the serial numbers is called a serial number list. The memory 52 updates the serial number list every time banknotes are stored in the temporary storage unit 23. The transport unit 4 transports any reject note determined to be abnormal by the recognition unit 24 to, for example, the dispense unit 22.

After all the banknotes placed into the deposit unit 21 are taken into the banknote handling device 1, the display unit 54 displays the deposit amount. The operator can confirm the deposit amount by operating the operation unit 53. The operator can also cancel the deposit process.

When the operator confirms the deposit amount, the controller 51 determines confirms the number of banknotes stored in the temporary storage unit 23, namely the number of banknotes to be deposited. After the controller 51 confirms the number of banknotes, the transport unit 4 transports each of the banknotes fed out of the temporary storage unit 23 to the first storage device 31, the second storage device 32, the third storage device 33, the fourth storage device 34, or the fifth storage device 35. The storage devices 31 to 35 thus store the banknotes (see the arrows in the lower figure 302 of FIG. 3). The controller 51 stores information on the banknotes stored in the storage devices 31 to 35 in the memory 52. For each storage device, the memory 52 stores the serial numbers of the banknotes in such a manner that the order of the serial numbers stored in the memory 52 matches the order of the banknotes stored in the storage device. The memory 52 updates the serial number list every time banknotes are stored in the storage devise 31 to 35.

When the operator cancels the deposit process, the transport unit 4 transports the banknotes fed out of the temporary storage unit 23 to the dispense unit 22. The banknotes are thus returned to the operator.

In the initial settings, the banknote handling device 1 can switch between two modes, a mode in which the banknote handling device 1 manages the serial numbers of banknotes stored in the storage devices 31 to 35, and a mode in which the banknote handling device 1 does not manage the serial numbers of banknotes stored in the storage devices 31 to 35. In the mode in which the banknote handling device 1 manages the serial numbers of banknotes stored in the storage devices 31 to 35, the memory 52 stores the serial numbers of banknotes having passed through the recognition unit 24, so that the controller 51 can perform a process that uses the stored serial numbers (e.g., a reconciliation process). In the mode in which the banknote handling device 1 does not manage the serial numbers of banknotes stored in the storage devices 31 to 35, the memory 52 does not store the serial number list.

Recovery After Error

If the banknote handling device 1 stops working due to an error such as a banknote jam during a deposit process and the banknotes stop at the connection point between the temporary storage unit 23 and the third transport path 43, the controller 51 cannot determine whether the banknotes counted based on the detection signals of the sensor have actually entered the temporary storage unit 23. As a result, the number of banknotes stored in the temporary storage unit 23 becomes uncertain. Similarly, when the banknotes stop at any of the connection points between the first to fifth storage devices 31 to 35 and the transport path, the controller 51 cannot determine whether the banknotes counted based on the detection signals of the sensor have actually entered the storage device. As a result, the number of banknotes stored in this storage device becomes uncertain.

When the number of banknotes stored in the temporary storage unit 23 or any of the storage devices 31 to 35 becomes uncertain, it is necessary to confirm the number of banknotes stored in the temporary storage unit 23 or the storage device 31 to 35.

When the number of banknotes stored in the temporary storage unit becomes uncertain, a conventional banknote handling device stops the deposit process and feeds all the banknotes stored in the temporary storage unit to the outside of the banknote handling device in order to confirm the number of banknotes stored in the temporary storage unit. The conventional banknote handling device then starts the deposit process over.

When the number of banknotes stored in any of the storage devices becomes uncertain, the conventional banknote handling device causes this storage device to feed out the banknotes stored in the storage unit of this storage device, causes the recognition unit to recognize the banknotes fed out of this storage device, and then stores these banknotes back into this storage device.

It takes a long time to check the number of all the banknotes stored in the temporary storage unit or the storage unit. The conventional banknote handling device therefore cannot quickly resume the deposit process.

As described above, the banknote handling device 1 is a self-service machine that is operated by a customer. It is therefore preferable that, when the banknote handling device 1 stops working due to an error, the banknote handling device 1 be able to recover from the error without human intervention. This is because the banknote handling device 1 would be out of service if it cannot recover from the error.

The banknote handling device 1 disclosed herein can efficiently recover from an error.

Specifically, the banknote handling device 1 uses different recovery procedures for the first case and the second case. As described above, the first case is the case where an error occurs while the transport unit 4 is transporting banknotes from the deposit unit 21 to the temporary storage unit 23 via the recognition unit 24, as shown in the upper figure 301 of FIG. 3. The second case is the case where an error occurs while the transport unit 4 is transporting banknotes from the temporary storage unit 23 to the storage devices 31 to 35, as shown in the lower figure 302 of FIG. 3. By using different recovery procedures for the first and second cases, the banknote handling device 1 can efficiently recover from the error. Hereinafter, the error recovery procedures will be described in detail with reference to the drawings.

Recovery Procedure for First Case

First Pattern

After the banknote handling device 1 stops working due to an error that occurs while the transport unit 4 is transporting banknotes from the deposit unit 21 to the temporary storage unit 23 via the recognition unit 24, the controller 51 causes the transport unit 4 to transport the banknotes remaining on the transport path in the handling unit housing 11 to the dispense unit 22 to clear the transport path.

Figure 4A:
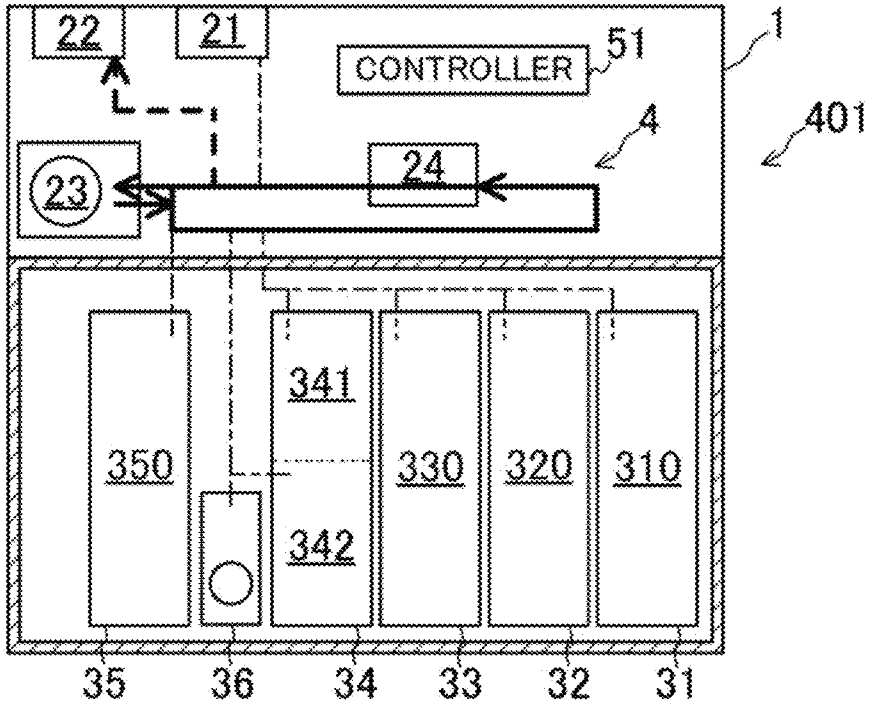
FIGS. 4A and 4B show an exemplary banknote transport route related to recovery from an error.

The number of banknotes stored in the temporary storage unit 23 is uncertain due to the error. Therefore, after the transport path is cleared, the controller 51 confirms the number of banknotes stored in the temporary storage unit 23. FIG. 4A illustrates a transport route of banknotes after the transport path is cleared. The controller 51 causes the temporary storage unit 23 to feed out at least two of the banknotes stored therein (see the solid arrows arrow in FIG. 4A). The transport unit 4 transports the banknotes fed out of the temporary storage unit 23 to the recognition unit 24, and the recognition unit 24 recognizes them. The recognition unit 24 also reads their serial numbers. The controller 51 matches these read serial numbers against the serial number list stored in the memory 52. At the time the error occurs, the memory 52 has the serial number list of the banknotes stored in the temporary storage unit 23. The order of the serial numbers in the serial number list matches the storage order of the banknotes. Therefore, when the positions of the banknotes fed out of the temporary storage unit 23 are identified in the serial number list, the banknotes still remaining in the temporary storage unit 23 can be identified. By using the serial number list, the controller 51 can check the number of banknotes stored in the temporary storage unit 23 without feeding out all the banknotes stored in the temporary storage unit 23. The controller 51 can thus quickly check the number of banknotes stored in the temporary storage unit 23. As a result, the banknote handling device 1 can quickly recover from the error.

The process of checking the number of banknotes stored in the temporary storage unit 23 is herein sometimes referred to as the reconciliation process. The reconciliation process using the serial number list is called a partial reconciliation process because the temporary storage unit 23 feeds out only a part of the stored banknotes.

Of the banknotes having passed through the recognition unit 24, the transport unit 4 transports the banknotes determined to be normal by the recognition unit 24 to the temporary storage unit 23. In the portion surrounded by the dashed double-dotted line in FIG. 2, driving sources for transporting banknotes, specifically, a motor for the temporary storage unit 23 and a motor for the third transport path 43 connecting the loop transport path 40 and the temporary storage unit 23, are independent of a motor for the loop transport path 40. Therefore, after the banknotes fed out of the temporary storage unit 23 are sent to the loop transport path 40, the driving direction of the motors is reversed, so that the normal notes can be transported to and stored in the temporary storage unit 23 as shown by the solid arrows in FIG. 4A. Since the normal notes are not transported to the dispense unit 22, it reduces the number of banknotes to be returned to the operator when the banknote handling device 1 recovers after it stops working due to the error.

Of the banknotes having passed through the recognition unit 24, the transport unit 4 transports any abnormal note determined to be abnormal by the recognition unit 24 to the dispense unit 22, as shown by the dashed arrow in FIG. 4A. That is, any banknote determined to be abnormal by the recognition unit 24 is returned to the operator. However, this rarely happens because the banknotes fed out of the temporary storage unit 23 are the banknotes once determined to be normal by the recognition unit 24. That is, once the banknotes are transported to the dispense unit 22 to clear the transport path, the banknotes are rarely transported to the dispense unit 22. Abnormal banknotes are those determined as not normal.

In the first case, the banknote handling device 1 can thus effectively recover from the error without human intervention. The banknote handling device 1 is therefore less likely to become out of service. Since the banknote handling device 1 recovers from the error without human intervention, this recovery method can avoid human error.

Once the number of banknotes stored in the temporary storage unit 23 is confirmed, the banknote handling device 1 resumes the deposit process. Since the banknote handling device 1 performs the partial reconciliation process, it reduces the time required to confirm the number of banknotes stored in the temporary storage units 23. Moreover, after the banknote handling device 1 stops working due to the error, the banknote handling device 1 can resume the deposit process without making the customer wait for a long time.

When the deposit process is resumed, the operator places all the banknotes he or she has for deposit, including the returned banknotes, into the deposit unit 21. As described above, of the banknotes to be deposited, those already stored in the temporary storage unit 23 are not placed into the deposit unit 21. Therefore, the deposit process is not started over but is resumed from where it was stopped. Therefore, the banknote handling device 1 can quickly end the deposit process.

After the recovery from the error, the controller 51 can continue to manage the banknotes stored in the temporary storage unit 23 and the storage devices 31 to 36, based on the serial numbers.

The transport path 42 may be configured to transport banknotes in both directions (that is, the discharging direction toward the dispense unit 22 and the direction opposite to the discharging direction). In this configuration, in the recovery procedure for the first pattern, the banknotes transported from the temporary storage unit 23 and accumulated in the dispense unit 22 may be transported in the direction opposite to the discharging direction to the temporary storage unit 23 via the recognition unit 24. In this case, the operator does not need to place the returned banknotes back into the deposit unit 21.

Second Pattern

Figure 4B:
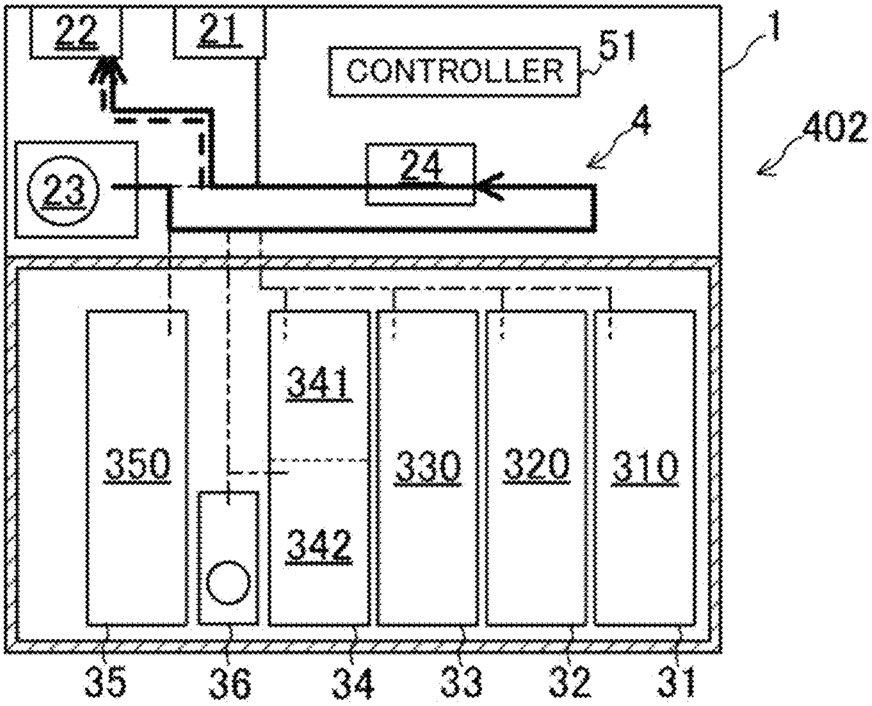

A second pattern is different from the first pattern in the transport destination of the banknotes having passed through the recognition unit 24. Of the banknotes having passed through the recognition unit 24, the transport unit 4 transports both the banknotes determined to be normal and the banknotes determined to be abnormal to the dispense unit 22, as shown by the solid and dashed arrows in FIG. 4B. As in the first pattern, only a part of the banknotes stored in the temporary storage unit 23 is transported to the dispense unit 22 in the second pattern as well. The number of banknotes returned to the operator and placed back into the deposit unit 21 by the operator is therefore minimized. Accordingly, the banknote handling device 1 can quickly recover from the error, and can quickly end the deposit process after it is resumed.

In the second pattern as well, the banknote handling device 1 can effectively recover from the error without human intervention. After the recovery from the error, the controller 51 can continue to manage the banknotes stored in the temporary storage unit 23 and the storage devices 31 to 36, based on the serial numbers.

In the second pattern, the banknote handling device 1 performs the partial reconciliation process again some time after the banknotes are transported to the dispense unit 22 to clear the transport path. Therefore, some banknotes are accumulated in the dispense unit 22 due to this partial reconciliation process, which may make the operator feel uncomfortable.

As in the first pattern, when the transport path 42 is configured to transport banknotes in both directions (that is, the discharging direction toward the dispense unit 22 and the direction opposite to the discharging direction), the banknotes transported from the temporary storage unit 23 and accumulated in the dispense unit 22 may be transported in the direction opposite to the discharging direction to the temporary storage unit 23 via the recognition unit 24 in the recovery procedure for the second pattern. In this case as well, the operator does not need to place the returned banknotes back into the deposit unit 21.

Third Pattern

Figure 5:
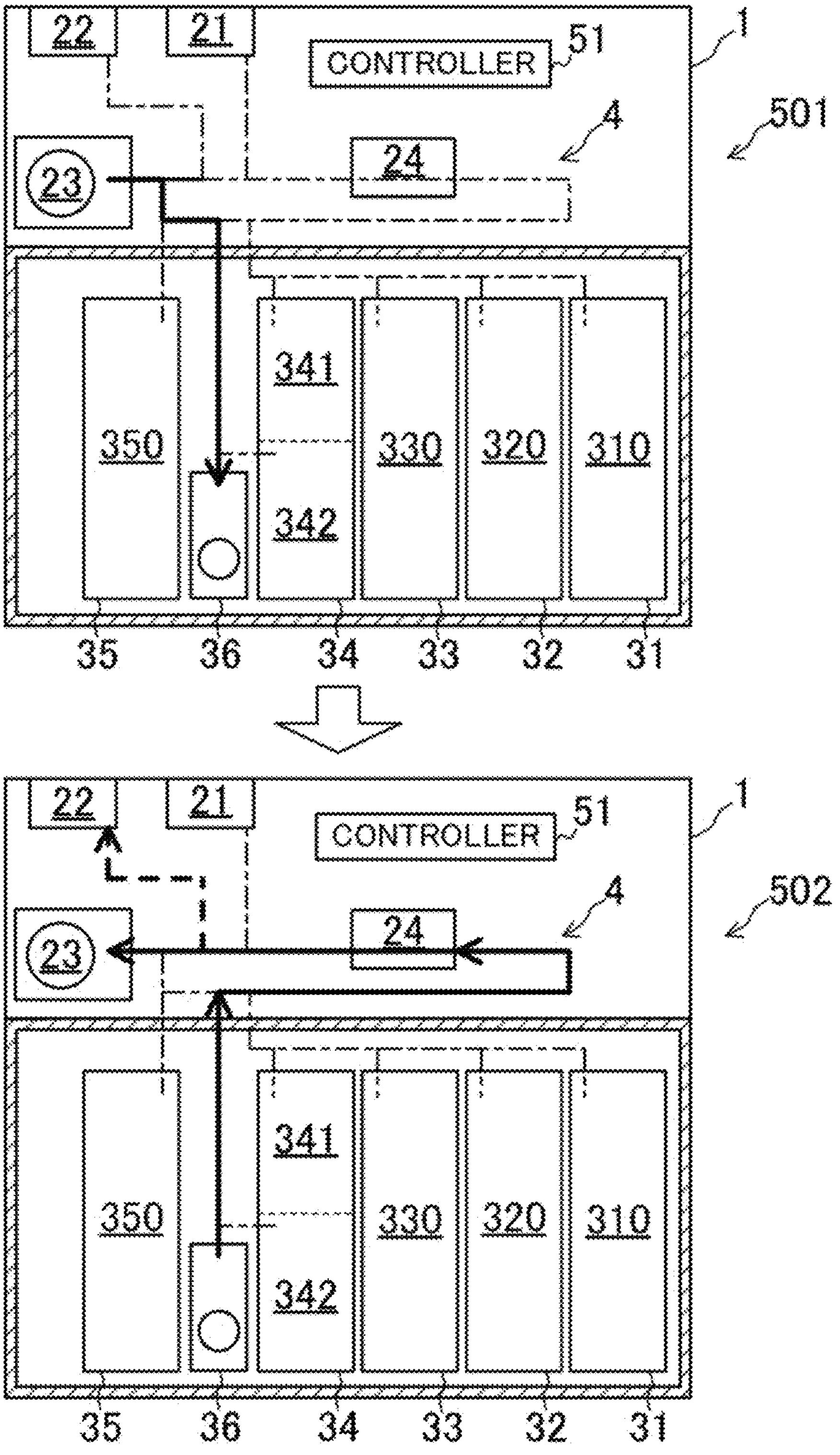
FIG. 5 shows exemplary banknote transport routes related to recovery from an error.

FIG. 5 illustrates a transport route of banknotes in a third pattern. The third pattern uses the small storage device 36. As in the first pattern and the second pattern, the temporary storage unit 23 feed out at least two of the banknotes stored therein. As shown by the solid arrow in the upper figure 501 of FIG. 5, the transport unit 4 transports the banknotes fed out of the temporary storage unit 23 to the small storage device 36, and the small storage devices 36 stores them.

As shown by the solid arrows in the lower figure 502 of FIG. 5, after all the banknotes fed out of the temporary storage unit 23 are stored in the small storage device 36, the small storage device 36 feeds out the banknotes. The transport unit 4 transports the banknotes fed out of the small storage device 36 to the recognition unit 24. As in the first and second patterns, the recognition unit 24 recognizes the banknotes and reads their serial numbers. Of the banknotes having passed through the recognition unit 24, the transport unit 4 transports normal notes to the temporary storage unit 23 and transports any abnormal note to the dispense unit 22, as in the first pattern. As described above, since the banknotes are rarely determined to be abnormal, most of the banknotes will not be transported to the dispense unit 22. This configuration is therefore less likely to make the operator feel uncomfortable.

In the third pattern as well, the banknote handling device 1 can quickly recover from the error, and can quickly end the deposit process after it resumed. The banknote handling device 1 can effectively recover from the error without human intervention. After the recovery from the error, the controller 51 can continue to manage the banknotes stored in the temporary storage unit 23 and the storage devices 31 to 36, based on the serial numbers.

Unlike in the first pattern, the small storage device 36 is used in the third pattern. Therefore, it is not necessary to reverse the driving direction of the motors while the banknotes are being transported. The recovery procedure for the first pattern can be performed in banknote handling devices with a specific configuration in which separate driving sources are used for specific portions including the temporary storage unit 23. On the other hand, the recovery procedure for the third pattern can be performed in banknote handling devices with various configurations. The recovery procedure for the third pattern may be performed using the storage device other than the small storage device 36. The storage device that is used in the third pattern may be a tape storage unit because the tape storage unit can stably store and feed out banknotes.

Switching of Patterns

For example, an administrator of the banknote handling device 1 may select one of the first, second, and third patterns in advance and store the selected pattern in the memory 52. The controller 51 performs recovery from an error according to the pattern stored in the memory 52.

Alternatively, when the banknote handling device 1 stops working due to an error, the communication unit 55 may send information to the management device 56, and the administrator of the banknote handling device 1 may perform a selection operation of selecting one of the first, second, and third patterns using the management device 56. The controller 51 performs recovery from the error according to the pattern selected when the error occurs.

Alternatively, when the banknote handling device 1 stops working due to an error, the display unit 54 may display information, and the administrator of the banknote handling device 1 or a customer of a financial institution may select one of the first, second, and third patterns via the operation unit 53.

Recovery Procedure for Second Case

First Pattern

Figure 6:
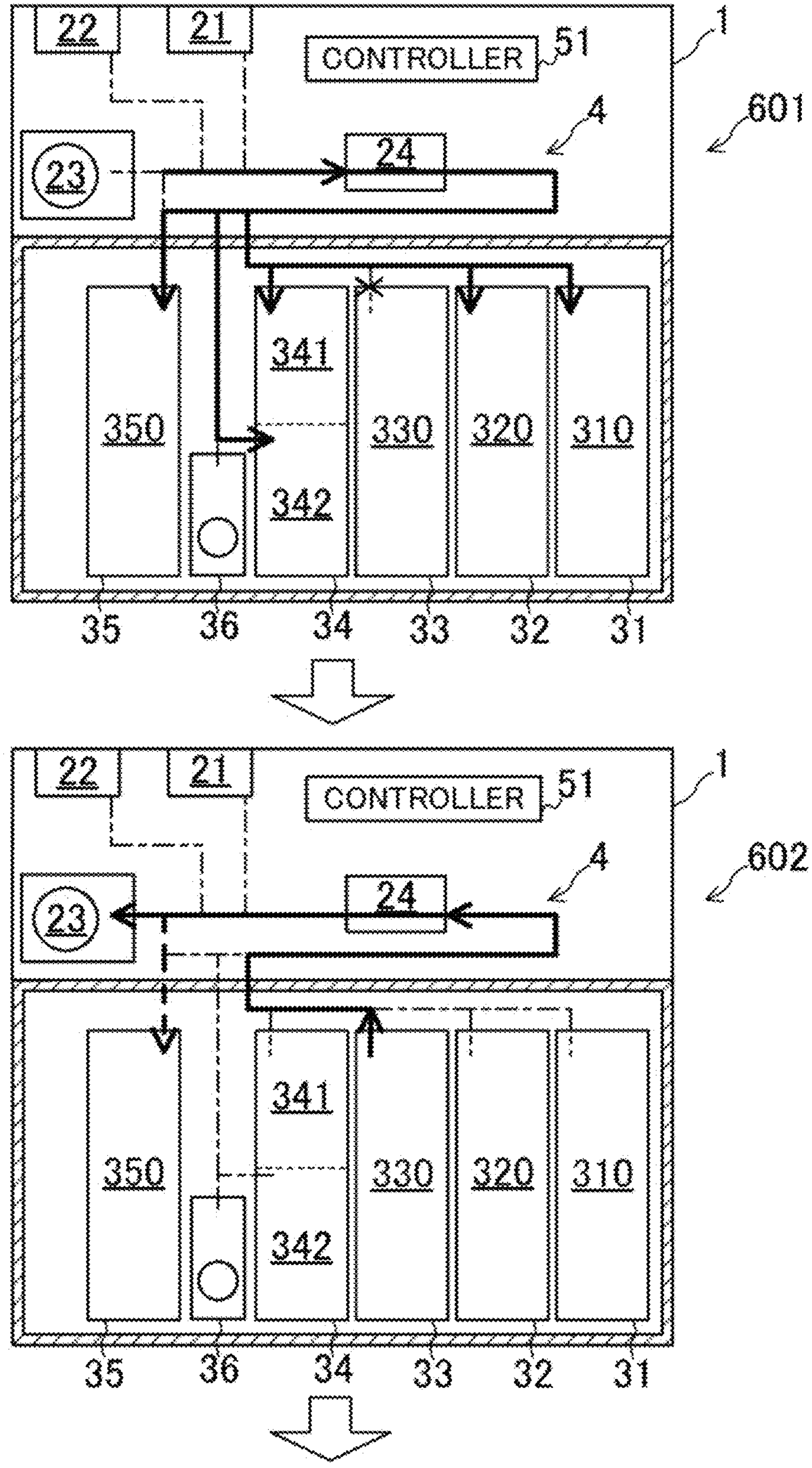
FIG. 6 shows exemplary banknote transport routes related to recovery from an error.

FIG. 6 illustrates the recovery procedure for the second case. It is assumed in the example of FIG. 6 that the banknote handling device 1 stops working due to an error that occurs while the transport unit 4 is transporting banknotes from the temporary storage unit 23 to the storage devices 31 to 35, and that the number of banknotes stored in the third storage device 33 becomes uncertain. For example, the number of banknotes stored in the third storage device 33 may become uncertain when a banknote jam occurs in the boundary region between the transport path 44 and the third storage device 33.

After the banknote handling device 1 stops working, the controller 51 causes the transport unit 4 to transport the banknotes remaining on the transport path to the storage devices to clear the transport path, as shown in the upper figure 601 of FIG. 6. When clearing the transport path, the transport unit 4 transports the banknotes to the storage devices 31, 32, 34, and 35 other than the third storage device 33 for which the number of banknotes stored therein is uncertain. The transport unit 4 transports each of the banknotes of the denominations other than the banknotes of the denomination that are supposed to be stored in the third storage device 33 to the storage device 31, 32, 34 or 35 according to the denomination of the banknote, and each storage device 31, 32, 34, 35 stores the banknotes. The memory 52 stores the serial numbers of the banknotes stored in each storage device in such a manner that the order of the serial numbers stored in the memory 52 matches the order of the banknotes stored in the storage device.

Of the banknotes remaining on the transport path, the transport unit 4 also transports the banknotes of the denomination that are supposed to be stored in the third storage device 33 to the fifth storage device 35 instead of the third storage device 33, and the fifth storage device 35 stores the banknotes. The controller 51 thus switches the transport destination of the banknotes. Since the fifth storage device 35 is a storage device that does not feed out banknotes, the banknotes that are supposed to be stored in the third storage device 33, that is, a part of the banknotes to be recycled, will not be able to be recycled. Banknotes are still stored in the temporary storage unit 23 even after the transport path is cleared by this procedure.

After the clearing of the transport path is completed, the controller 51 stops the deposit process and performs the reconciliation process, more precisely, the partial reconciliation process, on the third storage device 33 for which the number of banknotes stored therein is uncertain. Specifically, in the example of the lower figure 602 of FIG. 6, the third storage device 33 feeds out two or more banknotes, and the transport unit 4 transports these banknotes fed out of the third storage device 33 to the recognition unit 24. The recognition unit 24 recognizes these banknotes and reads their serial numbers. The controller 51 matches these read serial numbers against the serial number list stored in the memory 52. The controller 51 thus identifies the positions of these read serial numbers in the serial number list.

Since the third storage device 33 is a stack storage unit, the order of banknotes may change when the banknotes are stored in the third storage device 33. Accordingly, the controller 51 may identify the positions of the read serial numbers in the serial number list by matching a group of a plurality of banknotes, for example, five banknotes, successively fed out of the third storage device 33 against a group of a plurality of consecutive serial numbers in the serial number list. Each banknote has its own unique serial number. By identifying the positions of the serial numbers in the serial number list, it can be found that any banknote with a serial number located lower than these positions in the serial number list still remains in the third storage device 33. By using the serial number list, the controller 51 can check the number of banknotes stored in the third storage device 33 by merely causing the third storage device 33 to feed out a part of the stored banknotes. The controller 51 can thus check the number of banknotes stored in the third storage device 33 in a short time. As a result, the banknote handling device 1 can quickly recover from the error.

Of the banknotes having passed through the recognition unit 24, the transport unit 4 transports normal notes to the temporary storage unit 23, and the temporary storage unit 23 stores them, as shown by the solid arrow in the lower figure 602 of FIG. 6. As described above, the temporary storage unit 23 is a tape storage unit. Therefore, although banknotes are stored in the temporary storage unit 23, the storage order of banknotes in the temporary storage unit 23 will not change. The temporary storage unit 23 can be used as a temporary banknote storage unit during the partial reconciliation process. As shown by the dashed arrow in the lower figure 602 of FIG. 6, the transport unit 4 also transports any banknote determined to be abnormal to the fifth storage device 35, and the fifth storage device 35 stores the abnormal note. Since this banknote is the banknote that has been confirmed to be deposited, this banknote will not be dispensed to the dispense unit 22. The banknote handling device 1 can be set so that, for example, any unfit note such as a soiled or torn note is determined to be abnormal.

Figure 7:
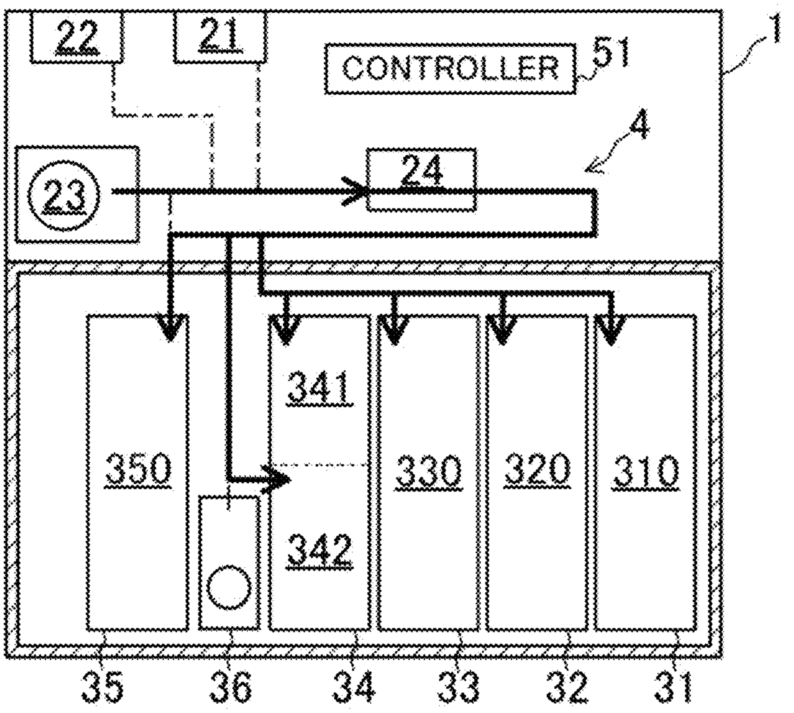
FIG. 7 shows an exemplary banknote transport route related to recovery from an error.

When the number of banknotes stored in the third storage device 33 is confirmed, the banknote handling device 1 resumes the deposit process. Specifically, as shown in FIG. 7, the temporary storage unit 23 feeds out the banknotes to be deposited, and the transport unit 4 transports them to each storage device. Since the number of banknotes stored in the third storage device 3 is not uncertain at this time, the transport unit 4 also transports the banknotes to the third storage device 33. In other words, the third storage device 33 can be restored since the number of banknotes stored in the third storage device 33 is confirmed. When all the banknotes are fed out of the temporary storage unit 23 and each storage device stores them, the deposit process is completed.

When recovering from the error, the reconciliation process is performed on the storage device for which the number of banknotes stored therein is uncertain. Therefore, after the recovery from the error, the controller 51 can continue to manage the banknotes stored in the storage devices 31 to 36, based on the serial numbers.

According to the first pattern, recovery is performed when the banknote handling device 1 stops working due to an error that occurs while the transport unit 4 is transporting banknotes from the temporary storage unit 23 to the storage devices 31 to 35. As compared with a second pattern that will be described below, the fifth storage device 35 will not be used too often for deposit purposes, and therefore the fifth storage device 35, for example, is less likely to become full of banknotes quickly.

In the second case as well, the banknote handling device 1 can effectively recover from the error without human intervention. The banknote handling device 1 is therefore less likely to become out of service. Since the banknote handling device 1 recovers from the error without human intervention, this recovery method can avoid human error.

Second Pattern

Figure 8:
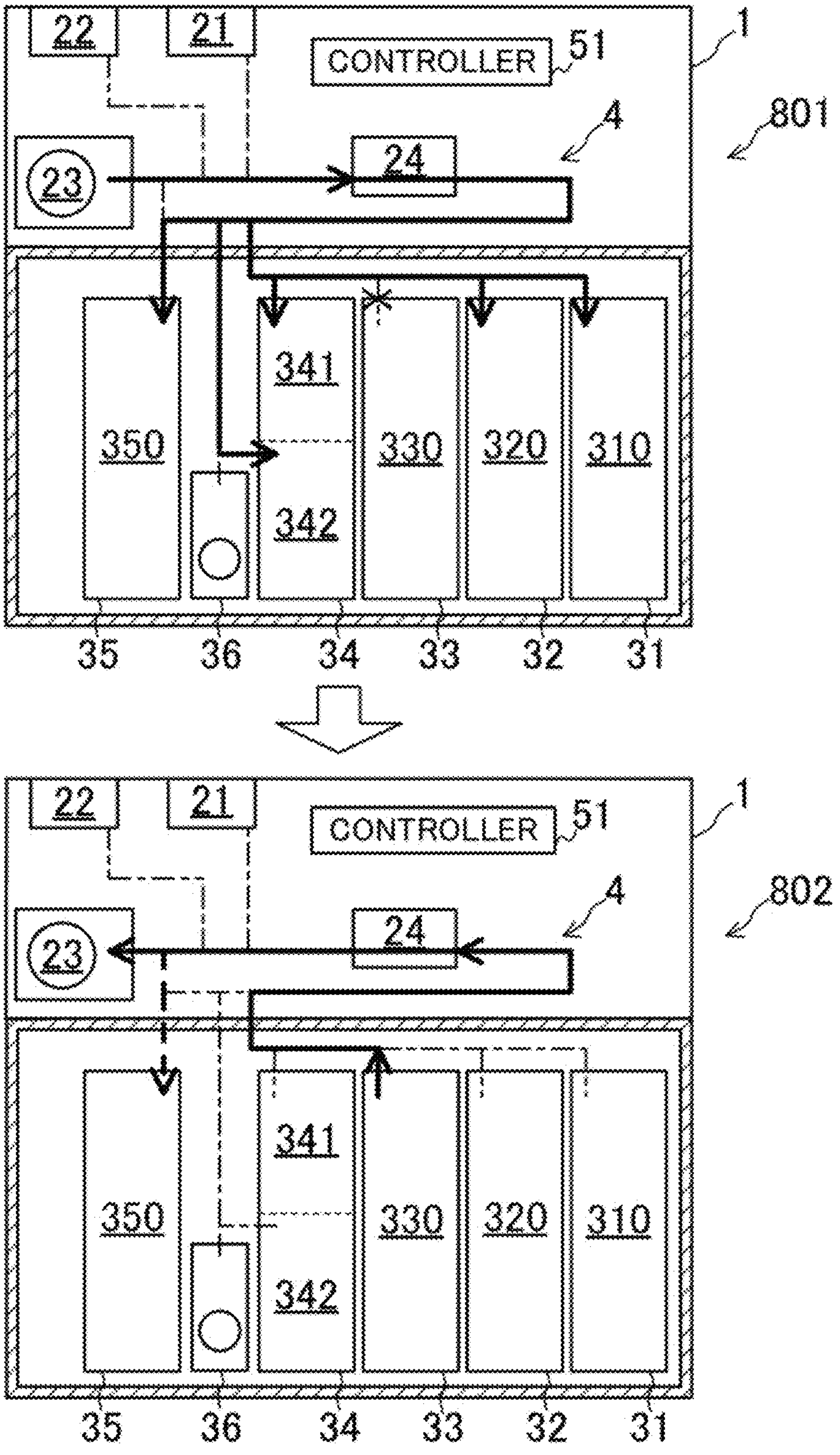
FIG. 8 shows exemplary banknote transport routes related to recovery from an error.

FIG. 8 illustrates the procedure for a second pattern. FIG. 8 also shows an example in which the number of banknotes stored in the third storage device 33 is uncertain. In the first pattern, after the transport of the banknotes from the temporary storage unit 23 to the storage devices is stopped and the reconciliation process is performed on the storage device for which the number of banknotes stored therein is uncertain, the deposit process is resumed and the banknotes in the temporary storage unit 23 are stored in each storage device. In the second pattern, on the other hand, the transport of the banknotes from the temporary storage unit 23 to each storage device is continued until the banknotes stored in the temporary storage unit 23 are stored in each storage device, and the reconciliation process is then performed on the storage device for which the number of banknotes stored therein is uncertain.

The upper figure 801 of FIG. 8 shows a transport route of banknotes after the clearing of the transport path shown in the upper figure 601 of FIG. 6 is completed. The temporary storage unit 23 feeds out the banknotes to be deposited, and the transport unit 4 transports each of the banknotes to the storage device 31, 32, 34 or 35 according to its denomination. Since the number of banknotes stored in the third storage device 33 is uncertain at this time, the transport unit 4 transports the banknotes of the denomination that are supposed to be stored in the third storage device 33 to the fifth storage device 35 instead of the third storage device 33. The controller 51 thus switches the transport destination of the banknotes.

After the temporary storage unit 23 feeds out all the banknotes and each storage device stores the banknotes, the third storage device 33 feeds out two or more banknotes and the transport unit 4 transports these banknotes fed out of the third storage device 33 to the recognition unit 24, as shown in the lower figure 802 of FIG. 8. The recognition unit 24 recognizes these banknotes and reads their serial numbers. The controller 51 matches these read serial numbers against the serial number list for the third storage device 33 to check the number of banknotes stored in the third storage device 33.

Of the banknotes having passed through the recognition unit 24, the transport unit 4 transports normal notes to the temporary storage unit 23 as shown by the solid arrow in the lower figure 802 of FIG. 8, and transports any banknote determined to be abnormal to the fifth storage device 35 as shown by the dashed arrow in the lower figure 802 of FIG. 8.

The banknote handling device 1 recovers from the error when the number of banknotes stored in the third storage device 33 is confirmed. After the recovery from the error, the banknote handling device 1 can perform the process using the third storage device 33, and the controller 51 can continue to manage the banknotes stored in the storage devices 31 to 36, based on the serial numbers.

The banknotes temporarily stored in the temporary storage unit 23 in the lower figure 802 of FIG. 8 are fed out of the temporary storage unit 23 and stored in the third storage device 33.

The banknote handling device 1 can quickly empty the temporary storage unit 23 by storing the banknotes for deposit stored in the temporary storage unit 23 in each storage device. The second pattern is advantageous in that priority can be given to the deposit process being performed when the error occurred.

The transport of the banknotes from the temporary storage unit 23 to each storage device shown in the upper figure 801 of FIG. 8 and the partial reconciliation process for the storage device shown in the lower figure 802 of FIG. 8 need not be performed successively. After transporting the banknotes from the temporary storage unit 23 to each storage device as shown in the upper figure 801 of FIG. 8 and completing the deposit process, the banknote handling device 1 may perform a process different from this deposit process, such as a deposit process or dispense process for another customer, before performing the partial reconciliation process.

According to the second pattern, in situations such as when a plurality of customers is waiting to use the banknote handling device 1, the banknote handling device 1 can continue the deposit or withdrawal process without needing time to perform the reconciliation process on the storage device for which the number of banknotes stored therein is uncertain (in the above example, the third storage device 33). This configuration reduces an increase in customer wait time.

In this case, the banknote handling device 1 performs the deposit or withdrawal process without using the third storage device 33 for which the number of banknotes stored therein is uncertain. Specifically, when performing the deposit process, the controller 51 stores the banknotes of the denomination that are supposed to be stored in the third storage device 33 in the fifth storage device 35. When performing the withdrawal process, the controller 51 causes the other storage devices 31, 32, and 34 to feed out the banknotes of the denominations that can be substituted for the banknotes of the denomination that are supposed to be fed out of the third storage device 33.

Third Pattern

A third pattern is the same as the first pattern in that priority is given to the reconciliation process for the storage device for which the number of banknotes stored therein is uncertain. The third pattern is different from the first pattern in that, when performing the reconciliation process, the remaining capacity of the temporary storage unit 23 is small and the temporary storage unit 23 therefore feeds out a part of the stored banknotes to make room for banknotes. The third pattern is the same as the second pattern in that the temporary storage unit 23 feeds out the banknotes before the reconciliation process.

The upper figure 801 of FIG. 8 shows the first step in the third pattern after the clearing of the transport path shown in the upper figure 601 of FIG. 6 is finished. In this case, the temporary storage unit 23 feeds out only a part of the stored banknotes. The number of banknotes to be fed out of the temporary storage unit 23 varies depending on the number of banknotes stored in the temporary storage unit 23. The temporary storage unit 23 feeds out the banknotes to make room for at least about ten banknotes. The transport unit 4 transports the banknotes fed out of the temporary storage unit 23 to each storage device. At this time, as described above, the banknotes are transported to the storage devices other than the third storage device 33 for which the number of banknotes stored therein is uncertain.

After room is thus made in the temporary storage unit 23, the third storage device 33 for which the number of banknotes stored therein is uncertain feeds out two or more banknotes for the reconciliation process as shown in the lower figure 602 of FIG. 6. The transport unit 4 transports the banknotes fed out of the third storage device 33 to the recognition unit 24, and the recognition unit 24 recognizes the banknotes and reads their serial numbers. The controller 51 matches the read serial numbers against the serial number list to check the number of banknotes stored in the third storage device 33. The transport unit 4 transports normal notes having passed through the recognition unit 24 to the temporary storage unit 23 as shown by the solid arrow in the lower figure 602 of FIG. 6, and transports any banknote determined to be abnormal to the fifth storage device 35 as shown by the dashed arrow in the lower figure 602 of FIG. 6.

After the controller 51 checks the number of banknotes stored in the third storage device 33, the temporary storage unit 23 feeds out the banknotes and the transport unit 4 transports the banknotes fed out of the temporary storage unit 23 to each storage device, as shown in FIG. 7. At this time, the transport unit 4 also transports the banknotes to the third storage device 33 because the number of banknotes stored in the third storage device 33 is no longer uncertain.

In the third pattern, as in the first pattern, the controller 51 can quickly check the number of banknotes stored in the storage device for which the number of banknotes stored therein in uncertain by performing the partial reconciliation process. The banknote handling device 1 can thus quickly recover from the error. After the recovery from the error, the controller 51 can continue to manage the banknotes stored in the storage devices 31 to 36, based on the serial numbers.

In the third pattern, unlike in the second pattern, the number of banknotes to be stored in the fifth storage device 35 can be reduced. The banknote handling device 1 can secure a larger number of banknotes for recycling. The banknote handling device 1 can reduce a decrease in the remaining capacity of the fifth storage device 35.

Modifications of Transport Destination During Reconciliation Process

Figure 9A:
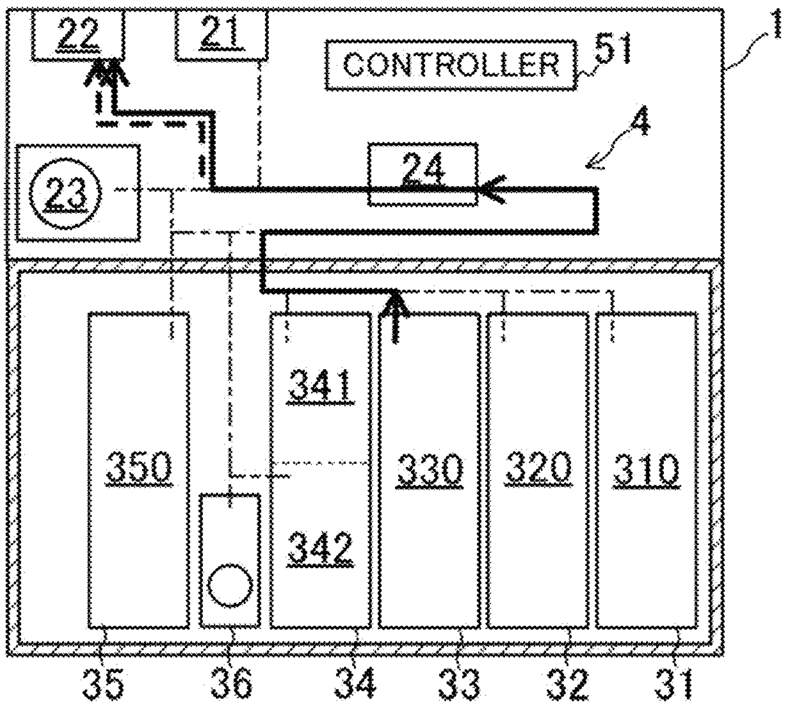
FIGS. 9A and 9B show an exemplary banknote transport route.

In each of the first, second, and third patterns of the recovery procedure for the second case, the banknotes having passed through the recognition unit 24 are transported to the temporary storage unit 23 or the fifth storage device 35. The banknote handling device 1 can change the transport destination of the banknotes. FIG. 9A shows an example in which both normal banknotes and any banknote determined to be abnormal are transported to the dispense unit 22. In this case, the banknotes dispensed out of the housing are the banknotes that have been confirmed to be deposited in the deposit process. Therefore, a person in charge from a financial institution who is an administrator having predetermined authority manages the banknotes dispensed out of the housing. For example, the administrator may operate the operation unit 53 of the banknote handling device 1 to perform a reversing process, namely a process of reversing the banknotes dispensed out of the housing back into the housing through the deposit unit 21.

In the case where the dispense unit 22 has a function to reverse the dispensed banknotes back into the housing, the dispense unit 22 reverses the dispensed banknotes back into the housing. In this case, the administrator does not need to manage the dispensed banknotes. The dispense unit 22 may have a shutter so that the dispensed banknotes cannot be touched.

Figure 9B:
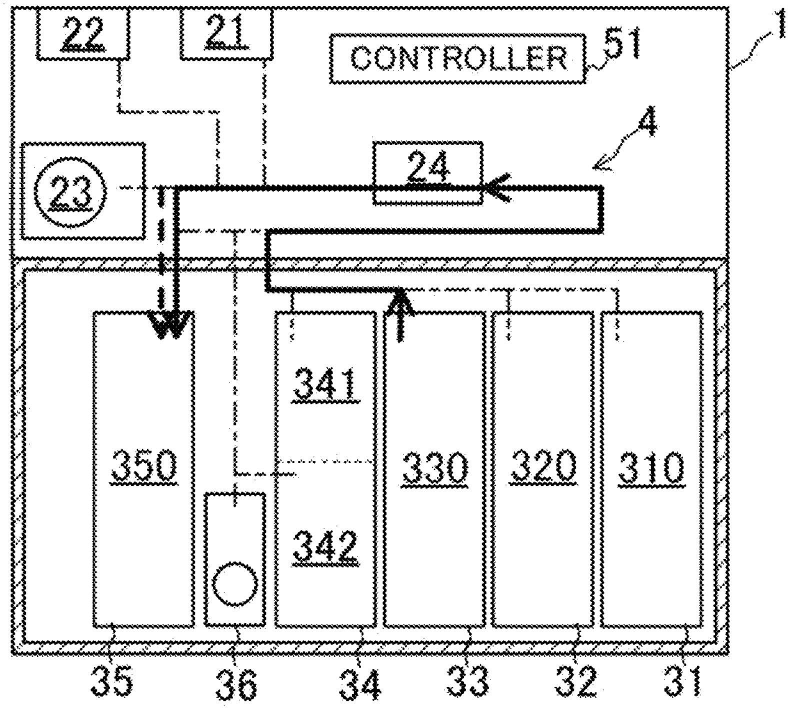

FIG. 9B shows an example in which both normal banknotes and any banknote determined to be abnormal are transported to the fifth storage device 35. As described above, the fifth storage device 35 does not feed out the stored banknotes. Therefore, when the banknotes are thus transported to the fifth storage device 35, the normal banknotes that can be recycled will not be able to be recycled. Transporting the banknotes to the fifth storage device 35 increases the number of banknotes stored in the fifth storage device 35. However, unlike in the case where the banknotes are transported to the dispense unit 22, there is no need for the administrator to reverse the dispensed banknotes back into the housing.

Switching of Patterns

For example, the administrator of the banknote handling device 1 may select one of the first, second, and third patterns of the recovery procedure for the second case in advance, and store the selected pattern in the memory 52. The controller 51 performs recovery from an error according to a pattern stored in the memory 52.

Alternatively, when the banknote handling device 1 stops working due to an error, the communication unit 55 may send information to the management device 56, and the administrator of the banknote handling device 1 may perform an operation of selecting one of the first, second, and third patterns using the management device 56. The controller 51 performs recovery from the error according to the pattern selected when the error occurs.

Alternatively, when the banknote handling device 1 stops working due to an error, the display unit 54 may display information, and the administrator of the banknote handling device 1 may select one of the first, second, and third patterns via the operation unit 53.

Flowchart Related to Recovery Process

Figure 10:
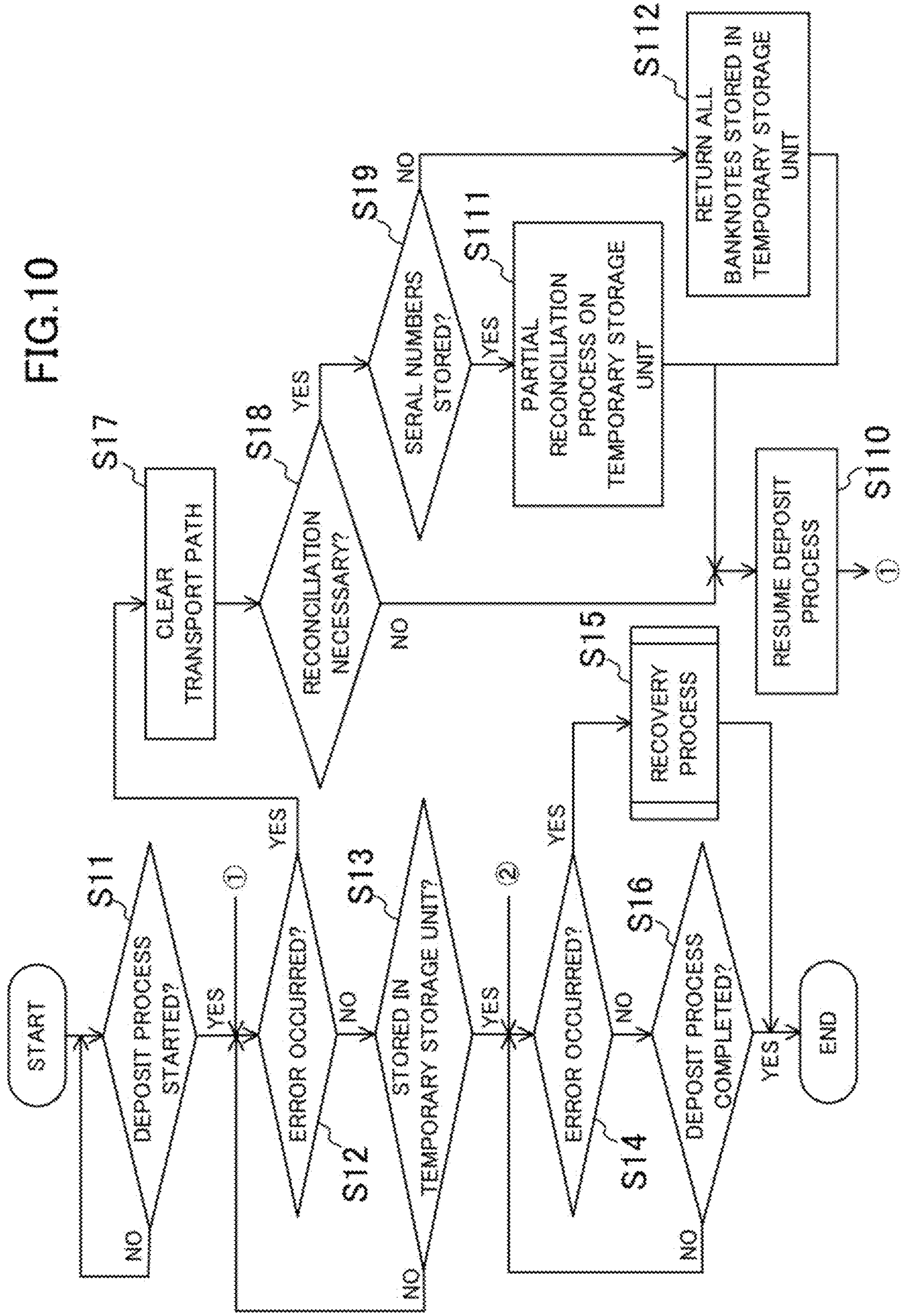
FIG. 10 shows an exemplary handling procedure related to recovery from an error.
Figure 11:
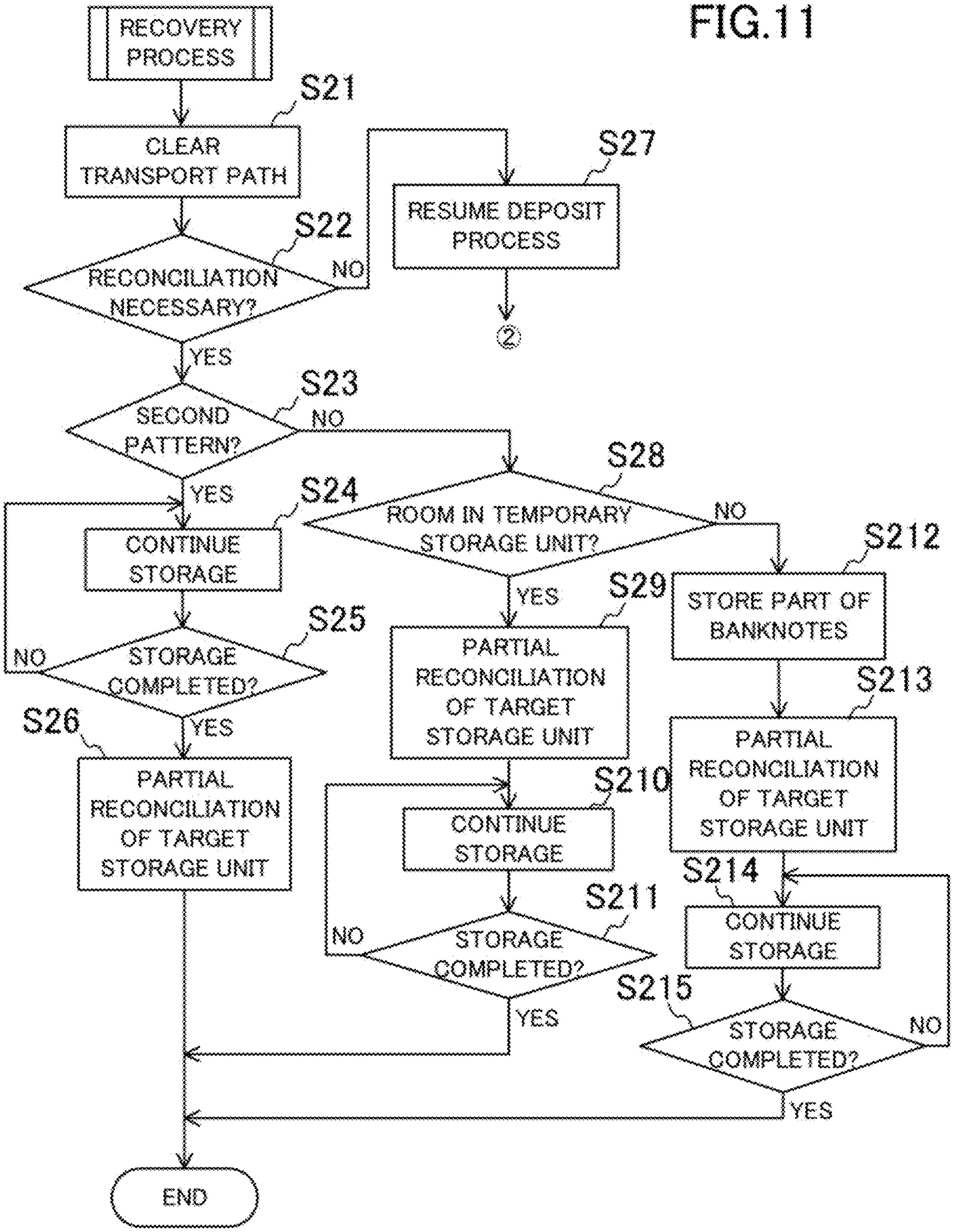
FIG. 11 shows an exemplary handling procedure related to recovery from an error.

FIGS. 10 and 11 are flowcharts showing a handling procedure that is performed by the controller 51 for the recovery process described above.

First, in step S11 after the start of the procedure, the controller 51 determines whether the banknote handling device 1 has started a deposit process. When the banknote handling device 1 has not started a deposit process, step S11 is repeated. When the banknote handling device 1 has started a deposit process, the routine proceeds to step S12.

In step S12, the controller 51 determines whether an error has occurred. The error in this step refers to an error that occurs while banknotes are being transported from the deposit unit 21 to the temporary storage unit 23. When no error has occurred, the routine proceeds to step S13. In step S13, the controller 51 determines whether all the banknotes to be deposited are stored in the temporary storage unit 23.

When YES in step S13, the routine proceeds to step S14. When NO in step S13, the routine returns to step S12.

When YES in step S12, that is, in the first case in which an error has occurred while the transport unit 4 was transporting the banknotes from the deposit unit 21 to the temporary storage unit 23 via the recognition unit 24, the routine proceeds to step S17. In step S17, the controller 51 clears the transport path. Specifically, the transport unit 4 transports the banknotes on the transport path in the handling unit housing 11 to the dispense unit 22. In the subsequent step S18, the controller 51 determines whether it is necessary to reconciliate the temporary storage unit 23. For example, in the case where the banknote handling device 1 stopped working because the banknotes stopped at the boundary with the temporary storage unit 23 and the number of banknotes stored in the temporary storage unit 23 became uncertain, the determination result of step S18 is YES. When YES in step S18, the routine proceeds to step S19. When NO in step S18, the routine proceeds to step S110. Since it is not necessary to reconciliate the temporary storage unit 23, the banknote handling device 1 can resume the deposit process. In step S110, the controller 51 resumes the deposit process. After the deposit process is resumed, the routine returns to step S12.

In step S19, the controller 51 determines whether the serial numbers of the banknotes stored in the temporary storage unit 23 are stored in the memory 52. In the case where the banknote handling device 1 manages banknotes using serial numbers, the determination result of step S19 is YES. In this case, the routine proceeds to step S111. In the case where the banknote handling device 1 does not manage banknotes using serial numbers, the determination result of step S19 is NO. In this case, the routine proceeds to step S112.

In step S111, the controller 51 causes the temporary storage unit 23 to feed out a plurality of banknotes, and matches their serial numbers read by the recognition unit 24 against the serial number list to check the number of banknotes stored in the temporary storage unit 23, as described above. On the other hand, in step S112, the controller 51 cannot perform the reconciliation process using the serial numbers, and therefore the controller 51 causes the temporary storage unit 23 to feed out all the stored banknotes. The transport unit 4 transports all of these banknotes to the dispense unit 22. In this case, the banknote handling device 1 starts the deposit process over.

The flow after step S14 corresponds to the step of transporting the banknotes from the temporary storage unit 23 to each storage device. In the case where an error has occurred while the banknotes were being transported from the temporary storage unit 23 to each storage device, recovery is performed according to the recovery procedure for the second case.

First, in step S14, the controller 51 determines whether the banknote handling device 1 stopped working due to an error that occurred while the banknotes were being transported from the temporary storage unit 23 to each storage device. When YES in step S14, the routine proceeds to step S15. When NO in step S14, the routine proceeds to step S16. Step S15 relates to the procedure of the recovery process for the second case. The procedure of the recovery process for the second case will be described later with reference to the flowchart of FIG. 11.

In step S16, the controller 51 determines whether the deposit process is completed. When the deposit process is completed, the process ends. When the deposit process is not completed, the routine returns to step S14.

FIG. 11 illustrates a flowchart related to the recovery process of step S15 in FIG. 10. In the first step S21, the controller 51 clears the transport path. In the subsequent step S22, the controller 51 determines whether it is necessary to reconciliate the storage device. When the reconciliation is necessary, the routine proceeds to step S23. When the reconciliation is not necessary, the routine proceeds to step S27. In step S27, the controller 51 resumes the deposit process, and the routine returns to step S14 in FIG. 10.

On the other hand, when the reconciliation is necessary, the controller 51 determines in step S23 whether the second pattern is selected. When the selected pattern is the second pattern, the routine proceeds to step S24. When the selected pattern is not the second pattern, the routine proceeds to step S28.

In step S24, the controller 51 continues to transport the banknotes from the temporary storage unit 23 to each storage device and to store the banknotes in each storage device. In this case, no banknotes are transported to and stored in the storage device for which the number of banknotes stored therein is uncertain (see the upper figure of FIG. 8). The banknotes are transported to and stored in another storage device instead of the storage unit for which the number of banknotes stored therein is uncertain.

In the subsequent step S25, the controller 51 determines whether the storage of the banknotes to be deposited is completed. When the storage is completed, the routine proceeds to step S26. When the storage is not completed, the routine returns to step S24.

In step S26, the controller 51 performs the partial reconciliation process on the storage device for which the number of banknotes stored therein is uncertain. As described above, two or more banknotes are fed out of this storage device, and their serial numbers are matched against the serial number list (see the lower figure 802 of FIG. 8). The process ends when the partial reconciliation process is completed.

In step S28, the controller 51 determines whether the temporary storage unit 23 still has room for banknotes. This room refers to the room for the banknotes fed out of the storage device during the partial reconciliation process. When YES in step S28, the routine proceeds to step S29. When NO in step S28, the routine proceeds to step S212.

Steps S29 to S211 are the steps corresponding to the first pattern. In step S29, the controller 51 performs the partial reconciliation process on the storage device for which the number of banknotes stored therein is uncertain (see the lower figure 602 of FIG. 6). After the controller 51 checks the number of banknotes stored in this storage device by the partial reconciliation process, the controller 51 continues to transport the banknotes from the temporary storage unit 23 to each storage device and store them in each storage device in step S210 (see FIG. 7). In step S211, the controller 51 determines whether the storage of the banknotes in each storage device is completed. When the storage of the banknotes in each storage device is not completed, the routine returns to step S210. When the storage of the banknotes in each storage device is completed, the process ends.

Steps S212 to S215 are the steps corresponding to the third pattern. In step S212, the controller 51 first causes the temporary storage portion 23 to feed out a part of the stored banknotes, and stores them in the storage device (see the upper figure 801 of FIG. 8). After room is thus made in the temporary storage unit 23, the controller 51 performs in step S213 the partial reconciliation process on the storage device for which the number of banknotes stored therein is uncertain (see the lower figure 602 of FIG. 6). After the partial reconciliation process, the controller 51 continues to transport the banknotes from the temporary storage unit 23 to each storage device and store them in each storage device in step S214 (see FIG. 7). In step S215, the controller 51 determines whether the storage of the banknotes in each storage device is completed. When the storage of the banknotes in each storage device is not completed, the routine returns to step S214. When the storage of the banknotes in each storage device is completed, the process ends.

The banknote handling device 1 performs the recovery operation, which is described above, in each of the first case and the second case. Therefore, even if an error occurs during the deposit process, the banknote handling device 1 can automatically recover from the error without human intervention. When the banknote handling device 1 recovers from the error, it can resume the deposit process. The banknote handling device 1 is therefore suitable for being installed as a self-service machine in an office of a financial institution. The banknote handling device 1 can also be used as a so-called teller machine that is operated by a person in charge from a financial institution. Since the banknote handling device 1 can quickly recover from an error without human intervention, the banknote handling device 1 improves the work efficiency of a financial institution when used as a teller machine. Moreover, such automatic recovery from an error can avoid human error.

The banknote handling device 1 may be configured so that the controller 51 selectively performs at least one of the first process for the first case and the second process for the second case.

Other Embodiments

The banknote handling device to which the technique disclosed herein is applicable is not limited to the banknote handling device 1 with the structure illustrated in FIG. 2. The technique disclosed herein is applicable to banknote handling devices with various structures. The technique disclosed herein is also applicable to coin handling devices and handling devices for handling a valuable medium such as a check.

What is claimed is:

1. A medium handling method that is performed by a medium handling device when an error occurs during a medium deposit process of storing media from an inlet into a storage via a temporary storage, the medium handling method comprising:

recognizing the media sequentially taken into the medium handling device via the inlet by a detector;

storing the recognized media in the temporary storage;

storing the number of media stored in the temporary storage by a memory;

confirming the number of media stored in the temporary storage as a number of media deposited based on an operation of an operator by a controller;

after confirming the number of media stored in the temporary storage, storing the media fed out of the temporary storage in the storage, and storing the number of media stored in the storage by the memory; wherein the controller performs a reconciliation process in a case where the error occurs while a transport member is transporting the media to the temporary storage or the storage and the number of media stored in the memory becomes uncertain, the reconciliation process being a process in which the controller checks the number of media stored in the memory using the temporary storage while at least a part of the media remain in the temporary storage.

2. The medium handling method of claim 1, wherein the detector recognizes unique identification information given to each medium, the memory stores the identification information in association with a storage order of the media in the temporary storage, and the controller performs a first process as the reconciliation process in a first case where the error occurs while the transport member is transporting the media from the inlet to the temporary storage via the detector and the number of media stored in the temporary storage becomes uncertain, the first process being a process of checking the number of media stored in the temporary storage by matching the identification information of the media identified by the detector against the identification information stored in the memory.

3. The medium handling method of claim 2, wherein in the first process, the transport member transports the medium fed out of the temporary storage and recognized by the detector to the temporary storage.

4. The medium handling method of claim 3, wherein the transport member includes a loop transport path, and the media are transported along the loop transport path, the detector is located on the loop transport path, and the temporary storage is connected to the loop transport path.

5. The medium handling method of claim 3, wherein in the first process, the transport member transports the medium determined to be normal by the detector to the temporary storage, and transports any medium determined to be abnormal by the detector to the outside of the medium handling device.

6. The medium handling method of claim 2, wherein in the first process, the transport member transports the medium fed out of the temporary storage and recognized by the detector to the outside of the medium handling device.

7. The medium handling method of claim 2, wherein in the first process, the transport member transports the medium fed out of the temporary storage and recognized by the detector to a fourth storage different from the storage.

8. The medium handling method of claim 1, wherein the detector recognizes unique identification information given to each medium, the memory stores the identification information in association with a storage order of the media in the storage, and the controller performs a second process as the reconciliation process in a second case where the error occurs while the transport member is transporting the media from the temporary storage to the storage and the number of media stored in the storage becomes uncertain, the second process being a process of checking the number of media stored in the storage by matching the identification information of the media identified by the detector against the identification information stored in the memory.

9. The medium handling method of claim 8, wherein in the second process, the transport member transports the medium fed out of the storage and recognized by the detector to the temporary storage.

10. The medium handling method of claim 9, wherein before the second process is started, the controller causes the temporary storage to feed out a part of the media and stores the part of the media in a second storage different from the storage.

11. The medium handling method of claim 9, wherein in the second process, the transport member transports the medium determined to be normal by the detector to the temporary storage, and transports any medium determined to be abnormal by the detector to a third storage different from the temporary storage and the storage.

12. A medium handling device that performs a process when an error occurs during a medium deposit process, the medium handling device comprising:

an inlet that is located in a housing and that sequentially takes media into the housing;

a detector that recognizes the media in the housing;

a temporary storage that temporarily stores the media;

a storage that stores the media;

a transport member that includes a transport path and that transports the media among the inlet, the detector, the temporary storage, and the storage;

a memory; and a controller that controls the inlet, the detector, the temporary storage, the storage, the transport member and the memory in the medium deposit process in such a manner that the controller causes the detector to recognize the media sequentially taken into the housing by the inlet and then stores the recognized media in the temporary storage, and stores the number of media stored in the temporary storage in the memory, and confirms the number of media stored in the temporary storage as a number of media deposited based on an operation of an operator, and after confirming the number of media stored in the temporary storage, the controller stores the media fed out of the temporary storage in the storage, and stores the number of media stored in the storage in the memory, wherein the controller performs a reconciliation process in a case where the error occurs while the transport member is transporting the media to the temporary storage or the storage and the number of media stored in the memory becomes uncertain, the reconciliation process being a process in which the controller checks the number of media stored in the memory using the temporary storage while at least a part of the media remain in the temporary storage.

13. The medium handling device of claim 12, wherein the detector recognizes unique identification information given to each medium, the memory stores the identification information in association with a storage order of the media in the temporary storage, and the controller performs a first process as the reconciliation process in a first case where the error occurs while the transport member is transporting the media from the inlet to the temporary storage via the detector and the number of media stored in the temporary storage becomes uncertain, the first process being a process of checking the number of media stored in the temporary storage by matching the identification information of the media identified by the detector against the identification information stored in the memory.

14. The medium handling device of claim 12, wherein the detector recognizes unique identification information given to each medium, the memory stores the identification information in association with a storage order of the media in the storage, and the controller performs a second process as the reconciliation process in a second case where the error occurs while the transport member is transporting the media from the temporary storage to the storage, and the number of media stored in the storage becomes uncertain, the second process being a process of checking the number of media stored in the storage by matching the identification information of the media identified by the detector against the identification information stored in the memory.

15. The medium handling device of claim 12, wherein the transport member includes a loop transport path, and the media are transported along the loop transport path, the detector is located on the loop transport path, and the inlet, the temporary storage, and the storage are connected to the loop transport path.

* * * * *